(12) United States Patent
LeeKong

(10) Patent No.: US 11,158,208 B2
(45) Date of Patent: Oct. 26, 2021

(54) INTERACTIVE COOKING APPLICATION

(71) Applicant: ALK Ventures LLC, Brooklyn, NY (US)

(72) Inventor: Aliya LeeKong, Brooklyn, NY (US)

(73) Assignee: ALK Ventures LLC, Brooklyn, NY (US)

( * ) Notice: Subject to any disclaimer, the term of this patent is extended or adjusted under 35 U.S.C. 154(b) by 460 days.

(21) Appl. No.: 15/943,012

(22) Filed: Apr. 2, 2018

(65) Prior Publication Data
US 2019/0139444 A1    May 9, 2019

Related U.S. Application Data

(60) Provisional application No. 62/583,551, filed on Nov. 9, 2017.

(51) Int. Cl.
| | | |
|---|---|---|
| *G09B 19/00* | (2006.01) | |
| *G09B 5/06* | (2006.01) | |
| *G06Q 50/12* | (2012.01) | |
| *G06F 3/0488* | (2013.01) | |

(52) U.S. Cl.
CPC ......... *G09B 19/0092* (2013.01); *G06Q 50/12* (2013.01); *G09B 5/065* (2013.01); *G06F 3/0488* (2013.01)

(58) Field of Classification Search
CPC .... G09B 19/0092; G09B 5/065; G09B 19/00; G06Q 50/12; G06F 3/048; G05B 2219/45111; G05B 2219/2643
See application file for complete search history.

(56) References Cited

U.S. PATENT DOCUMENTS

| | | | | |
|---|---|---|---|---|
| 5,218,527 | A * | 6/1993 | Ishikawa ............... | G06Q 20/20 426/233 |
| 2015/0290795 | A1* | 10/2015 | Oleynik ................. | B25J 9/0081 700/257 |
| 2016/0235239 | A1 | 8/2016 | Patadia | |

OTHER PUBLICATIONS

International Search Report and Written Opinion issued for PCT/US2018/25677, dated Jul. 19, 2018, 8 pp.

* cited by examiner

*Primary Examiner* — Jerry-Daryl Fletcher
(74) *Attorney, Agent, or Firm* — Zeller IP Group, PLLC; Kyle M. Zeller

(57) ABSTRACT

Methods, systems and apparatuses, including computer programs encoded on computer storage media, are provided herein for an interactive, educational cooking experience. The embodiments may display a cooking interface that includes various ingredients, kitchen appliances, cookware, and kitchen utensils that may be manipulated by a user. A number of instructions relating to one or more steps of a selected recipe may also be displayed via the cooking interface, such that the user may attempt to follow the instructions by interacting with the displayed items. The embodiments may determine whether such interactions are in accordance with the instructions and may display relevant feedback to the user.

18 Claims, 13 Drawing Sheets

INTERACTIVE COOKING APPLICATION

CROSS-REFERENCE TO RELATED APPLICATIONS

The present application claims benefit of U.S. provisional patent application Ser. No. 62/583,551, titled "Interactive Cooking Application," filed Nov. 9, 2017, which is incorporated by reference herein in its entirety.

BACKGROUND

This specification relates generally to educational software. More specifically, this specification relates to applications, systems and methods for providing an interactive, educational cooking experience.

More than ever, Americans are taking initiative to ensure that the foods they purchase and consume are healthy. Home cooking has become an increasingly desirable alternative to dining out or purchasing prepared meals, particularly among young consumers who view home cooking as not only a cheaper and healthier alternative, but also as an experience where they can develop skills and showcase their creative abilities. In a recent study, approximately 72% of Americans reported cooking four nights or more per week. Indeed, more than a third of these respondents reported that they planned to increase their cooking, with young consumers being twice as likely as their older counterparts to make this resolution. Unfortunately, these younger consumers do not have much confidence in their culinary abilities—less than half of consumers between ages 18 and 34 consider themselves to be "somewhat good" or "good" at cooking.

Cooking applications may provide an attractive solution. A number of currently available cooking applications allow users to learn the cooking process by following steps in a recipe. However, these programs provide little, if any, educational information, such as information about cooking techniques, food ingredients, kitchen appliances and kitchen utensils. Unfortunately, such educational information is particularly important in cooking because it allows users to develop versatile and holistic culinary skills by understanding each of the ingredients used in recipes and/or best-practices for safely using various kitchen appliances and utensils. Moreover, conventional cooking applications fail to provide accurate, detailed feedback to users.

There thus remains a need for interactive cooking applications that provide an educational component to allow users to develop an enthusiasm for cooking, while learning about various cooking equipment and techniques. It would be beneficial if such applications were adapted to provide feedback to users while they interactively follow step-by-step recipe instructions.

SUMMARY

In accordance with the foregoing objectives and others, exemplary applications, methods and systems are disclosed herein to provide users with an interactive, educational cooking experience. The disclosed embodiments may guide users through an interactive cooking process, while providing education information. For example, embodiments of the application may display information relating to recipes, dishes and/or ingredients (e.g., step-by-step instructions, ingredient flavor profiles, country of origin, common uses, safety information, portion sizes, nutritional information, etc.); kitchen appliances (e.g., descriptions, operating instructions, best practices, safety information, etc.); and/or various cookware and kitchen utensils (e.g. common uses, safety information, care instructions, cooking techniques, trivia facts, country of origin, etc.).

In one embodiment, a method for providing an interactive, educational cooking experience is provided. The method may include displaying any number of recipes to a user and receiving a recipe selection from the user. The method may further include displaying, to the user, recipe instructions associated with the selected recipe, wherein the instructions typically include a plurality of steps. Generally, such steps may be associated with one or more cooking actions relating to one or more ingredients, cookware items, kitchen appliances and/or kitchen utensils. The method may further include displaying an interactive cooking interface to a user. The cooking interface may comprise an environment such as a digital representation of a kitchen including one or more of: the ingredients, the cookware items, the kitchen appliances, and the kitchen utensils.

The method may also include displaying a current recipe step to the user and then receiving a user action relating to one or more of the displayed items in the kitchen environment. For example, the user may select an ingredient and drag it into a pan on a stove. As the user completes the action, feedback information may be determined and/or provided to the user.

The method may further include determining whether the user action is correct, based on a comparison between the action and the current recipe step. Upon a determination that the user has taken the correct user action, the method may then display one or more results of the completed step. The method may then determine whether the current step is the last step in the recipe. If so, the method may end by, for example, displaying a completed dish to the user. If not, the current step may be set to the next step in the recipe and such step may be displayed to the user so that they may perform the next user action.

In one embodiment, a computer-implemented method is provided. The method may include (A) storing, by a computer, in a memory: a plurality of available ingredients, one or more available kitchen appliances, one or more available cookware items, and one or more available kitchen utensils. The method may also include (B) storing, by the computer, in the memory, a plurality of available recipes, each available recipe associated with recipe information including a plurality of sequential recipe steps, wherein each of the recipe steps relating to a given available recipe may be associated with: (1) one or more required cooking items selected from the group consisting of: a required ingredient selected from the plurality of available ingredients, a required kitchen appliance selected from the one or more available kitchen appliances, a required cookware item selected from the one or more available cookware items, and a required kitchen utensil selected from the one or more available kitchen utensils; (2) a required action relating to the one or more required cooking items; and/or (3) an instruction relating to the required action. The method may include (C) displaying, by the computer, to a user, the plurality of available recipes; (D) receiving, by the computer, from the user, a selected recipe from the plurality of available recipes; (E) displaying, by the computer, to the user, a cooking interface that includes the one or more required cooking items associated with a current recipe step, wherein each of the one or more required cooking items may be associated with a current state, and wherein each of the one or more required cooking items may be displayed via the cooking interface according to the respective current state; (F) providing, by the computer, to the user, the instruction associated with the current recipe step; (G) receiving, by the computer, from the user, a user action relating to the one or more required cooking items associated with the current recipe step; and (H) providing, by the computer, to the user, feedback information relating to the user action. In certain embodiments, the method may also include, (I) upon determining by the computer that the user action matches the required action associated with the current recipe step, (1) updating the current state of the one or more required cooking items associated with the current step, based on the user action; and (2) upon determining by the computer that the current recipe step is not a last recipe step associated with the selected recipe, (i) updating the current recipe step to a next recipe step associated with the selected recipe, and (ii) repeating steps E through I.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Various interactive, educational cooking applications, systems and methods are disclosed herein. Exemplary embodiments may display detailed instructions relating to any number of recipes that may be digitally "cooked" by a user. The embodiments may provide an interactive cooking interface comprising any number of selectable ingredients, cookware and bakeware items (collectively referred to herein as "cookware" items), kitchen appliances, and/or kitchen utensils. Each of these displayed items may be manipulated by the user (e.g., via touch input such as dragging, dropping, rotating, shaking, etc.). The disclosed embodiments may receive input from a user (i.e., user action(s)) relating to one or more of the displayed items, and may provide textual, graphical and/or auditory feedback to the user, based on the user action(s) and/or the recipe instructions.

In certain embodiments, the cooking applications may provide educational information to a user, such as information about dishes, recipes, ingredients, cookware, kitchen appliances, and/or kitchen utensils. For example, the interface may provide ingredient information relating to any number of ingredients, as desired by a user or as required by an educational curriculum. Additionally or alternatively, the cooking interface may provide positive or negative feedback to the user, based on received input. For example, the interface may display textual, graphical and/or auditory feedback relating to a status of a dish that is being prepared by the user (e.g., animations or sounds representing boiling, heating, burning, etc.). As another example, the interface may display textual information confirming that the user has correctly completed a recipe step or explaining why a particular user action was performed incorrectly.

Figure 1:
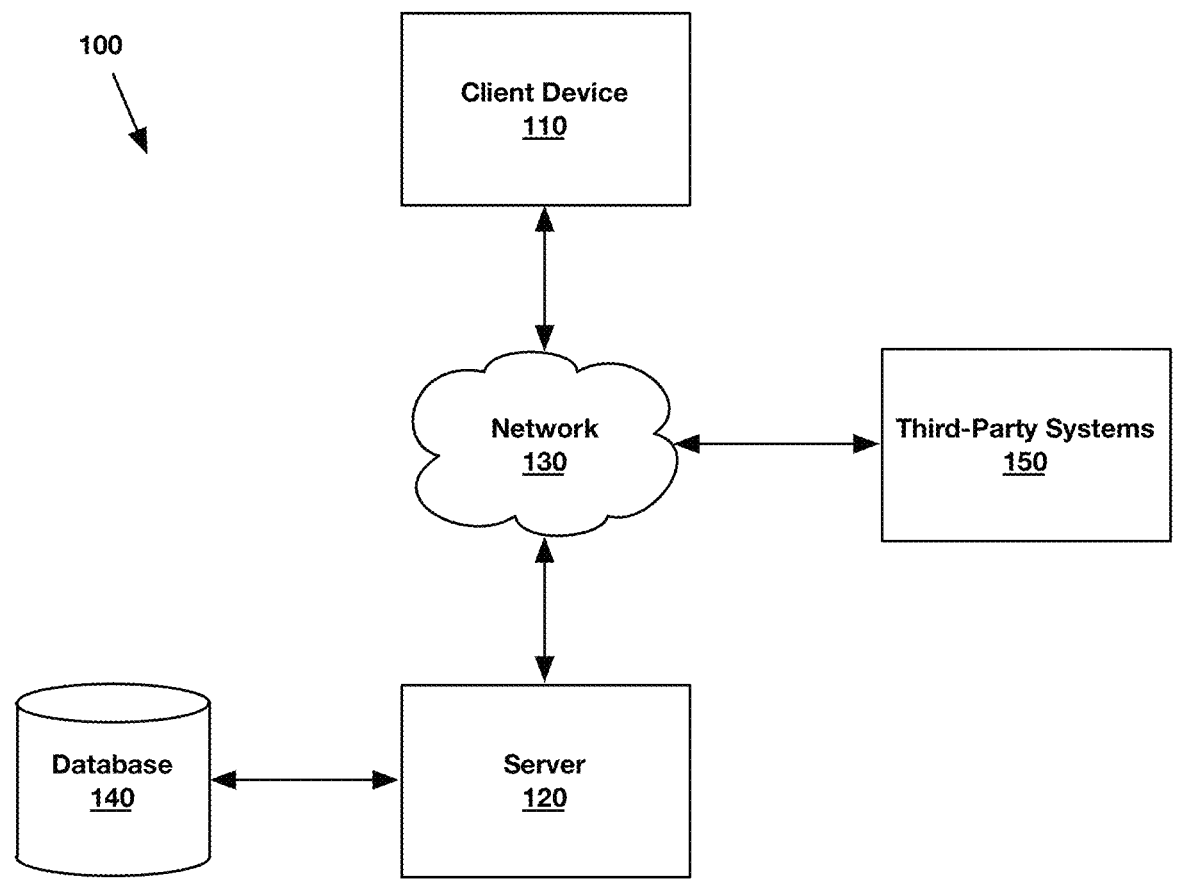
FIG. 1 shows a block diagram of an exemplary interactive educational cooking system 100 according to an embodiment.

Referring to FIG. 1, a block diagram of an exemplary system according to an embodiment is illustrated. As shown, the system comprises any number of users accessing a server 120 via a network 130. In certain embodiments, a user may access the server 120 via a client device 110 connected to the network 130.

Generally, a client device 110 may be any device capable of running a cooking application and/or of accessing the server 120 (e.g., via the cooking application or via a web browser). Exemplary client devices 110 may include general purpose desktop computers, laptop computers, smartphones, and/or tablets. Preferred client devices include those with touch screens to allow users to view, select and manipulate various items displayed by the cooking application (also referred to as a "client application"). In other embodiments, client devices 110 may comprise virtual reality ("VR") and/or augmented reality ("AR") hardware and software, which allow users to provide input via physical gestures.

The relationship of client 110 and server 120 arises by virtue of computer programs running on the respective computers and having a client-server relationship to each other. Accordingly, each of the client devices 110 may have a client application running thereon, where the client application may be adapted to communicate with a server application running on a server 120, for example, over a network 130. Thus, the client application and server 120 may be remote from each other. Such a configuration may allow users of client applications to input information and/or interact with the server from any location.

As discussed in detail below, a cooking application may be adapted to present various user interfaces to users. Such user interfaces may be based on information stored on the client device 110 and/or received from the server 120. Accordingly, the cooking application may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code).

The cooking application can be deployed and/or executed on one or more computer machines that are located at one site or distributed across multiple sites and interconnected by a communication network. In one embodiment, a cooking application may be installed on (or accessed by) one or more client devices 110. For example, a user may download a cooking application to their mobile device (e.g., from the Google Play Store or Apple App Store) or may navigate to a webapp using an internet browser.

In certain embodiments, the server 120 and/or the client device 110 may be adapted to receive, determine, record and/or transmit application information. The application information may be received from and/or transmitted to the cooking application. Moreover, any of such application information may be stored in and/or retrieved from one or more local or remote databases (e.g., database 140).

Exemplary application information may include: user information, recipe information, ingredient information, kitchen appliance information, cookware information, kitchen utensil information and/or cooking action information. Generally, user information may include, but is not limited to: user identification information (e.g., name, screen name, password, image, bio, etc.); contact information (e.g., email address, mailing address, phone number, etc.); billing information (e.g., credit card information, billing address, etc.); account balance information (e.g. points or online "currency" awarded to the user for completing certain tasks, points or online "currency" the user has purchased); user skill level information (e.g., recipes executed successfully/unsuccessfully, average number of tries to successfully execute recipes, specific steps executed successfully/unsuccessfully); and/or settings information (e.g. night mode on/off, sound on/off, music on/off, notifications, etc.).

Exemplary recipe information may include, but is not limited to: a recipe type or category (e.g., appetizer, entree, dessert, spicy, mild, etc.), a description, images, videos, animations, audio files, recipe steps, cooking actions or techniques, ingredients, kitchen appliances, kitchen utensils, cookware items and/or feedback required to provide an interactive cooking interface for a particular recipe to a user. In certain embodiments, the various recipe information may be associated with one or more parameters, such as a minimum, maximum and/or required quantity, time or temperature.

Each ingredient modeled by the system may be associated with ingredient information, which may include, but is not limited to ingredient identification information (e.g., a name, a description, images, videos, animations, audio files); ingredient educational information (e.g., a flavor profile, texture, country of origin, common uses, nutritional information, safe-handling information and/or trivia facts); permitted/current ingredient parameters (e.g., a mass, a volume, a thickness or shape, a density, a moisture level or percentage, a specific heat capacity, a temperature, etc.); and/or one or more permitted/current preparation status (e.g., dirty, washed, dried, wet/soggy, skinned, peeled, chopped, sliced, diced, minced, whole, marinated, seasoned, etc.). Ingredient information may also include permission information, such as but not limited to: permitted cooking actions (e.g., washing, peeling, chopping, baking, boiling, freezing, etc.); permitted cookware items; permitted kitchen appliances; and/or permitted kitchen utensils.

In certain embodiments, ingredient information may be associated with one or more permitted/current cooking statuses or states, which relate to temperatures of an ingredient, whether an ingredient has been cooked, and/or how an ingredient has been cooked. Exemplary permitted/current cooking statuses may include, but are not limited to: frozen, thawed, raw, undercooked, cooked, rare, medium-rare, medium, well-done, burned, etc. And such cooking statuses may relate to a specific target temperature and/or a range of target temperatures (e.g., a chicken breast ingredient may be associated with a permitted status of "cooked" when it's temperature is between 60 and 75° C.).

In one embodiment, system may determine and/or store specific cooking times or ranges of cooking times required for an ingredient to reach a target temperature(s), wherein such time(s) may be based on: (1) any of the ingredient parameters associated with a given ingredient and (2) any of the kitchen appliances, cookware items, cooking methods and/or cooking temperatures employed to virtually cook a particular ingredient.

It will be appreciated that the application may model nearly any ingredient by employing such ingredient information. As an example, a chicken breast ingredient may be associated with ingredient information comprising: a current preparation status of "cubed and marinated"; a current temperature of 20° C. corresponding to a current cooking status of "thawed"; and a mass of 100 g. This ingredient may be further associated with a permitted cooking status of "cooked," for which the ingredient in its given state would require 8-12 minutes in a pan being heated by a stovetop set to medium heat to reach a target temperature of between 60 and 75° C.

Exemplary kitchen appliance information for a given appliance may include, but is not limited to: a name; a description; images; videos; animations; audio files; permitted/current status (e.g., on/off, temperature, empty/full, etc.); permitted/current settings (high heat, low heat, defrost, puree, etc.); permitted/current usage time (five minutes, until blended, until defrosted, etc.); permitted/current ingredients (e.g., toast for a toaster; coffee, tea and water for a coffee maker; beverages, soups, and food ingredients for a microwave; fruits, vegetables, legumes, and yogurt for a blender, etc.); and/or permitted/current cookware items. It will be appreciated that the application may model nearly any kitchen appliance by employing such information.

Exemplary cookware information may include, but is not limited to: a name, a description, images, videos, animations, audio files, one or more materials, a cooking rate, a cooking time, conductivity, available volume, dimensions, permitted/current ingredients, permitted/current appliances; permitted/current utensils; and/or permitted/current status (e.g., full, empty, displayed, hidden, open, closed, temperature, etc.). In certain embodiments, the application may model, display and/or allow users to interact with various cookware items, such as: pots, pans, lids, skillets, baking trays and others.

Exemplary kitchen utensil information may include, but is not limited to: a name, a description, images, videos, animations, audio files, common uses, trivia facts, country of origin, safety information, permitted/current status (e.g., in-use, clean, dirty, empty, full, new, rusty, etc.), material (e.g., metal, wood, iron, etc.), conductivity, usage time (twenty seconds to open a wine bottle, ten seconds to use tongs to transfer food from one location to another, two minutes to beat eggs with a whisk), permitted/current ingredients and/or permitted/current cookware items. The application may provide any number of kitchen utensils for use in preparing recipes. For example the kitchen utensils may include: tongs, whisks, forks, spoons, knives, measuring cups, pitchers, spatulas, graters, ladles, can openers, wine openers, and/or strainers.

Cooking action information may comprise information pertaining to a particular cooking action or technique, such as boiling, simmering, filleting, frying, dicing, mincing, whipping, tossing, chopping, measuring, stirring, adding or removing a cookware item to/from a kitchen appliance, using a kitchen utensil in combination with a cookware item or ingredient, setting a parameter of a kitchen appliance, combining ingredients, and/or others. Exemplary cooking action information may include, but is not limited to: a name, a description, reasons for using the action, a location where the cooking action is most commonly used, foods for which the cooking action is commonly used, a cooking action parameter, etc. Action parameters may include any of the above information relating to utensils, cookware, appliances, and/or ingredients to which a particular action relates. For example, a "whipping" action may comprise action parameters such as: egg whites and sugar, a whisk, medium-high speed, and a usage time of two minutes or whenever stiff meringue peaks form, and the finished product may be a meringue.

In one embodiment, a user action comprises one or more of the group consisting of: adding a cookware item to a kitchen appliance, removing a cookware item from a kitchen appliance, adding an ingredient to a kitchen appliance, removing an ingredient from a kitchen appliance, adding an ingredient to a kitchen utensil, removing an ingredient from a kitchen utensil, moving a kitchen utensil to an ingredient, adding an ingredient to a cookware item, removing an ingredient from a cookware item, adding a first ingredient to one or more additional ingredients, setting a parameter of a kitchen appliance, and setting a parameter of a kitchen utensil.

In one embodiment, the server 120 may be connected to one or more third-party systems 150 via the network 130. Third-party systems 150 may store information in one or more databases that may be accessed by the server. Exemplary third-party systems may include, but are not limited to: payment and billing systems, nutritional information systems, social media and messaging systems, photo storage and sharing systems, address book systems, to-do list and shopping list management systems and/or cloud-based storage and backup systems. The server 120 may be capable of retrieving and/or storing information from third-party systems 150, with or without user interaction. Moreover, the server may be capable of transmitting stored information to third-party systems.

Figure 2:
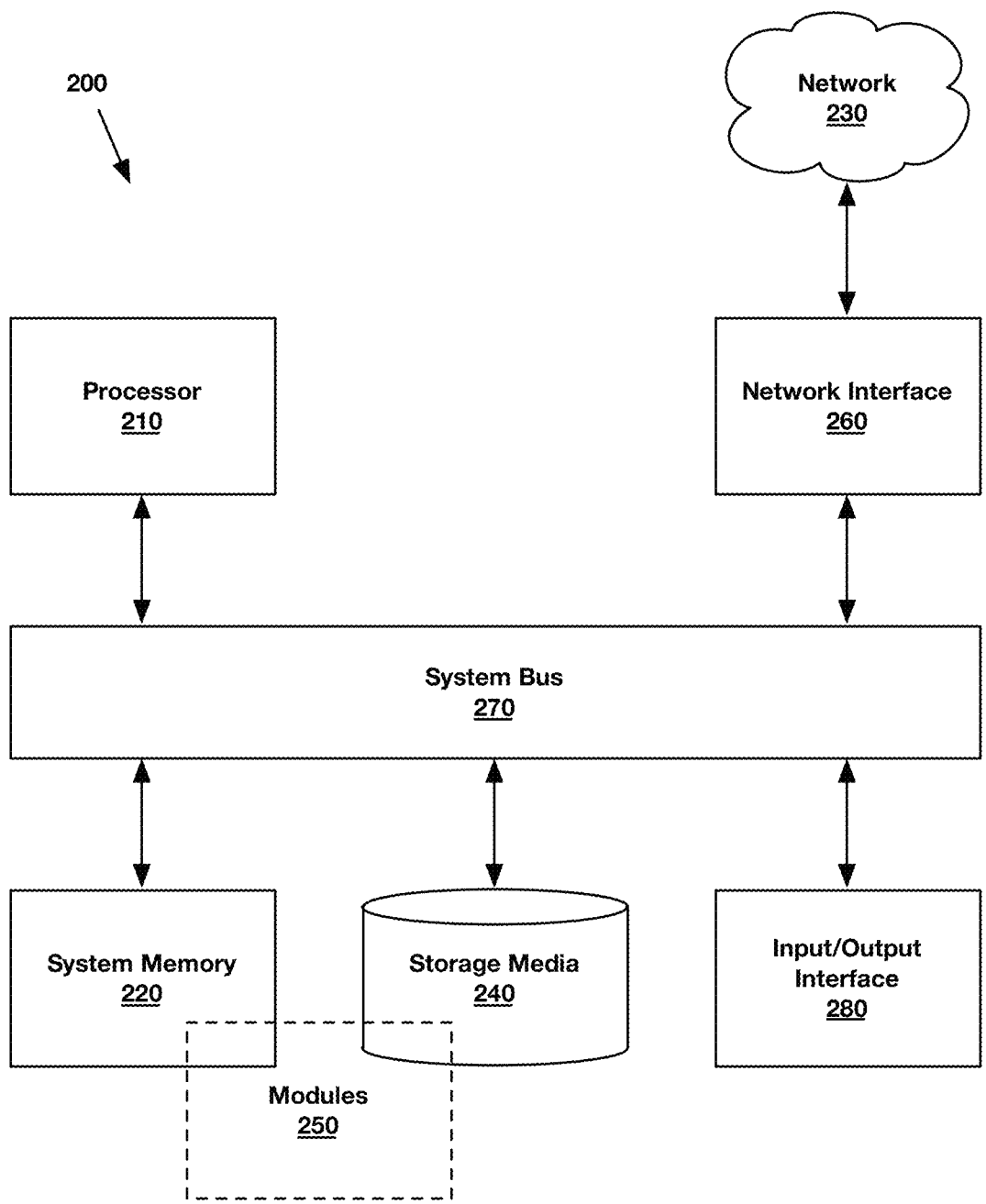
FIG. 2 shows a block diagram of an exemplary computing machine 200 and modules 250 according to an embodiment.

Referring to FIG. 2, a block diagram is provided illustrating a computing machine 200 and modules 250 in accordance with one or more embodiments presented herein. The computing machine 200 may correspond to any of the various computers, servers, mobile devices, embedded systems, or computing systems presented herein (e.g., the client device(s) 110, server(s) 120, and/or third-party system(s) 150 of FIG. 1). The modules 250 may comprise one or more hardware or software elements configured to facilitate the computing machine 200 in performing the various methods and processing functions presented herein.

The computing machine 200 may comprise all kinds of apparatuses, devices, and machines for processing data, including but not limited to, a programmable processor, a computer, and/or multiple processors or computers. As shown, an exemplary computing machine 200 may include various internal and/or attached components, such as a processor 210, system bus 270, system memory 220, storage media 240, input/output interface 280, and network interface 260 for communicating with a network 230.

The computing machine 200 may be implemented as a conventional computer system, an embedded controller, a laptop, a server, a mobile device, a smartphone, a set-top box, over-the-top content TV ("OTT TV"), Internet Protocol television ("IPTV"), a kiosk, a vehicular information system, one more processors associated with a television, a customized machine, any other hardware platform and/or combinations thereof. Moreover, a computing machine may be embedded in another device, such as but not limited to, a mobile telephone, a personal digital assistant ("PDA"), a smartphone, a tablet, a mobile audio or video player, a game console, a Global Positioning System ("GPS") receiver, or a portable storage device (e.g., a universal serial bus ("USB") flash drive). In some embodiments, the computing machine 200 may be a distributed system configured to function using multiple computing machines interconnected via a data network or system bus 270.

The processor 210 may be configured to execute code or instructions to perform the operations and functionality described herein, manage request flow and address mappings, and to perform calculations and generate commands. The processor 210 may be configured to monitor and control the operation of the components in the computing machine 200. The processor 210 may be a general-purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 210 may be a single processing unit, multiple processing units, a single processing core, multiple processing cores, special purpose processing cores, coprocessors, or any combination thereof. In addition to hardware, exemplary apparatuses may comprise code that creates an execution environment for the computer program (e.g., code that constitutes one or more of: processor firmware, a protocol stack, a database management system, an operating system, and a combination thereof). According to certain embodiments, the processor 210 and/or other components of the computing machine 200 may be a virtualized computing machine executing within one or more other computing machines.

The system memory 220 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 220 also may include volatile memories, such as random-access memory ("RAM"), static random-access memory ("SRAM"), dynamic random-access memory ("DRAM"), and synchronous dynamic random-access memory ("SDRAM"). Other types of RAM also may be used to implement the system memory. The system memory 220 may be implemented using a single memory module or multiple memory modules. While the system memory is depicted as being part of the computing machine 200, one skilled in the art will recognize that the system memory may be separate from the computing machine without departing from the scope of the subject technology. It should also be appreciated that the system memory may include, or operate in conjunction with, a non-volatile storage device such as the storage media 240.

The storage media 240 may include a hard disk, a compact disc read only memory ("CD-ROM"), a digital versatile disc ("DVD"), a Blu-ray disc, a magnetic tape, a flash memory, other non-volatile memory device, a solid-state drive ("SSD"), any magnetic storage device, any optical storage device, any electrical storage device, any semiconductor storage device, any physical-based storage device, any other data storage device, or any combination or multiplicity thereof. The storage media 240 may store one or more operating systems, application programs and program modules such as module, data, or any other information. The storage media may be part of, or connected to, the computing machine 200. The storage media may also be part of one or more other computing machines that are in communication with the computing machine such as servers, database servers, cloud storage, network attached storage, and so forth.

The modules 250 may comprise one or more hardware or software elements configured to facilitate the computing machine 200 with performing the various methods and processing functions presented herein. The modules 250 may include one or more sequences of instructions stored as software or firmware in association with the system memory 220, the storage media 240, or both. The storage media 240 may therefore represent examples of machine or computer readable media on which instructions or code may be stored for execution by the processor. Machine or computer readable media may generally refer to any medium or media used to provide instructions to the processor. Such machine or computer readable media associated with the modules may comprise a computer software product. It should be appreciated that a computer software product comprising the modules may also be associated with one or more processes or methods for delivering the module to the computing machine via the network, any signal-bearing medium, or any other communication or delivery technology. The modules 230 may also comprise hardware circuits or information for configuring hardware circuits such as microcode or configuration information for an FPGA or other PLD.

The input/output ("I/O") interface 280 may be configured to couple to one or more external devices, to receive data from the one or more external devices, and to send data to the one or more external devices. Such external devices along with the various internal devices may also be known as peripheral devices. The I/O interface 280 may include both electrical and physical connections for operably coupling the various peripheral devices to the computing machine 200 or the processor 210. The I/O interface 280 may be configured to communicate data, addresses, and control signals between the peripheral devices, the computing machine, or the processor. The I/O interface 280 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface may be configured to implement only one interface or bus technology. Alternatively, the I/O interface may be configured to implement multiple interfaces or bus technologies. The I/O interface may be configured as part of, all of, or to operate in conjunction with, the system bus 270. The I/O interface 280 may include one or more buffers for buffering transmissions between one or more external devices, internal devices, the computing machine 200, or the processor 210.

The I/O interface 280 may couple the computing machine 200 to various input devices including mice, touch-screens, scanners, biometric readers, electronic digitizers, sensors, receivers, touchpads, trackballs, cameras, microphones, keyboards, any other pointing devices, or any combinations thereof. When coupled to the computing device, such input devices may receive input from a user in any form, including acoustic, speech, visual, or tactile input.

The I/O interface 280 may couple the computing machine 200 to various output devices such that feedback may be provided to a user via any form of sensory feedback (e.g., visual feedback, auditory feedback, or tactile feedback). For example, a computing device can interact with a user by sending documents to and receiving documents from a device that is used by the user (e.g., by sending web pages to a web browser on a user's client device in response to requests received from the web browser). Exemplary output devices may include, but are not limited to, displays, speakers, printers, projectors, tactile feedback devices, automation control, robotic components, actuators, motors, fans, solenoids, valves, pumps, transmitters, signal emitters, lights, and so forth. And exemplary displays include, but are not limited to, one or more of: projectors, cathode ray tube ("CRT") monitors, liquid crystal displays ("LCD"), light-emitting diode ("LED") monitors and/or organic light-emitting diode ("OLED") monitors.

Embodiments of the subject matter described in this specification can be implemented in a computing machine 200 that includes one or more of the following components: a backend component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network.

Accordingly, the computing machine 200 may operate in a networked environment using logical connections through the network interface 260 to one or more other systems or computing machines across the network 230. The network 230 may include wide area networks ("WAN"), local area networks ("LAN"), intranets, the Internet, wireless access networks, wired networks, mobile networks, telephone networks, optical networks, or combinations thereof. The network 230 may be packet switched, circuit switched, of any topology, and may use any communication protocol. Communication links within the network 230 may involve various digital or an analog communication media such as fiber optic cables, free-space optics, waveguides, electrical conductors, wireless links, antennas, radio-frequency communications, and so forth.

The processor 210 may be connected to the other elements of the computing machine 200 or the various peripherals discussed herein through the system bus 270. It should be appreciated that the system bus 270 may be within the processor, outside the processor, or both. According to some embodiments, any of the processor 210, the other elements of the computing machine 200, or the various peripherals discussed herein may be integrated into a single device such as a system on chip ("SOC"), system on package ("SOP"), or ASIC device.

Figure 3:
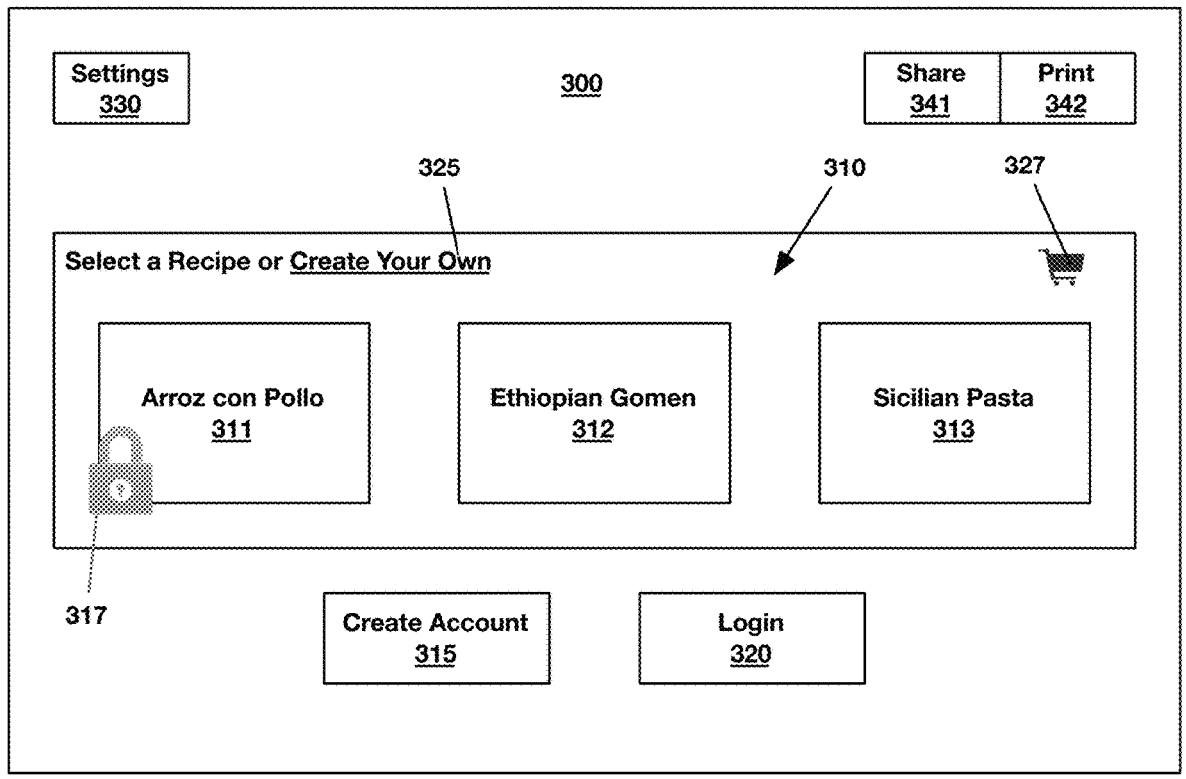
FIG. 3 shows an exemplary recipe selection screen 300 according to an embodiment.

Referring to FIG. 3, an exemplary recipe selection screen 300 of a cooking application embodiment is illustrated. As shown, the recipe selection screen 300 may display a recipes list 310 comprising any number of available recipes (311-313). The recipes list 310 may display any recipe information associated with each of the displayed recipes (311-313), such as a name and/or an image. Moreover, each of the recipes in the recipe list may comprise a hyperlink such that a user may select a recipe by touching or clicking.

Upon selecting a recipe (e.g., Sicilian Pasta 313) from the recipe list, the user may be navigated to an interactive cooking interface. As discussed below, the cooking interface may display various ingredients, kitchen appliances, cookware items and/or kitchen utensils associated with the selected recipe.

Additionally or alternatively, a user may select a "create your own" option 325 to advance to the interactive cooking interface without selecting an available recipe. In such cases, the cooking interface may comprise some or all available ingredients, kitchen appliances, cookware items and/or kitchen utensils to allow the user to learn about and/or experiment with the various items.

In one embodiment, one or more of the displayed recipes may be temporarily unavailable to a user (i.e., locked). As shown, locked recipes (e.g., "Arroz con Pollo" 311) may be displayed with a visual indication 317, such as a lock icon or the like. A user may unlock such recipes via purchase from an online store (e.g., Google Play, Apple Store, etc.), completion of one or more other available recipes, and/or by applying digital "currency" or points previously awarded to the user (e.g., for successfully completing tasks or for sharing various content).

In the illustrated embodiment, a shopping cart icon 327 comprises a link to an online store where a user can purchase and/or download in-app content, such as recipes, digital currency, ingredients, cookware items, kitchen appliances and/or kitchen utensils. The online store may be external to the application (e.g., Google Play, Apple Store, etc.) or may be internal to the application. And the recipes and other in-app content available through the online store may be created, uploaded, maintained, sponsored and/or removed by any number of corporate or individual users (e.g., chefs, grocery stores, restaurants, culinary schools, meal kit providers, etc.). For example, an ingredient-and-recipe meal kit service company may create an in-app recipe that corresponds to one of their meal kits such that their customers, upon receiving the meal kit, may download the recipe and use the cooking application to understand how to cook the meal kit.

The recipe selection screen 300 may comprise one or more links to allow a user to print application content 342 and/or share such content 341. In certain embodiments, content may be shared via one or more social media networks (e.g., Facebook, Instagram, Twitter, Google, etc.) and/or messaging applications (e.g., email, SMS, WhatsApp, GroupMe, etc.). Exemplary shareable application content may include screenshots of various steps in a cooking process, user accomplishments or "badges," and/or images of various in-app items (e.g., completed dishes, ingredients, kitchen utensils, kitchen appliances, cookware, etc.).

In certain embodiments, the recipe selection screen 300 (or a separate home screen) may allow a user to create a new account and/or login to an existing account via one or more displayed links. For example, a user may select a "create account" link 315 to navigate to an account creation screen. Such screen may display a number of form fields wherein the user may enter user information to set up a new account (e.g., first name, last name, email, password, confirm password, etc.). As another example, a user who has successfully created an account may login to the client application via a "login" link 320. It will be appreciated that account creation and/or login activities may implement a third-party identity or authentication service to verify the identity of a user (e.g., Facebook, Google, LinkedIn and/or Twitter).

Once a user signs into the application, they may be guided through a profile setup process. In such cases, a user may be presented with a form comprising any number of questions and/or entry fields. The user may enter required or desired user information, such as a name, age, email address, billing information, and/or other information. Information provided by the user may be associated with a user profile and stored in remote and/or local storage. Alternatively or additionally, user information may be requested or required when a user attempts to purchase a product (e.g., for the first time).

In one embodiment, the recipe selection screen 300 may further comprise a link 330 to a settings screen. The user may select this link to view and adjust settings provided by the application, such as sound settings, text settings, difficulty settings, display settings, and/or accessibility settings (e.g., zoom, font size, voiceover, etc.). In one embodiment, the user may be able to select a "read along" accessibility option, which may allow for spoken words to be highlighted in the application.

In certain embodiments, the user may be able to turn on/off parental controls via, for example, the settings screen. Such controls may be employed to prevent young children from accessing various features and content of the application, such as in-app purchases and/or specific recipes. When turned on, parental controls may require a user to answer one or more questions correctly in order to access certain aspects of the application. Exemplary questions may relate to grammar, spelling, history, cooking trivia, math and/or various other topics. Alternatively parental controls may require entry of a previously stored password.

Although not shown, exemplary recipe selection screens may comprise any number of links to additional screens, such as a tutorial screens, a contact information screen, a profile screen, a logout screen, and/or a user feedback screen.

Figure 4:
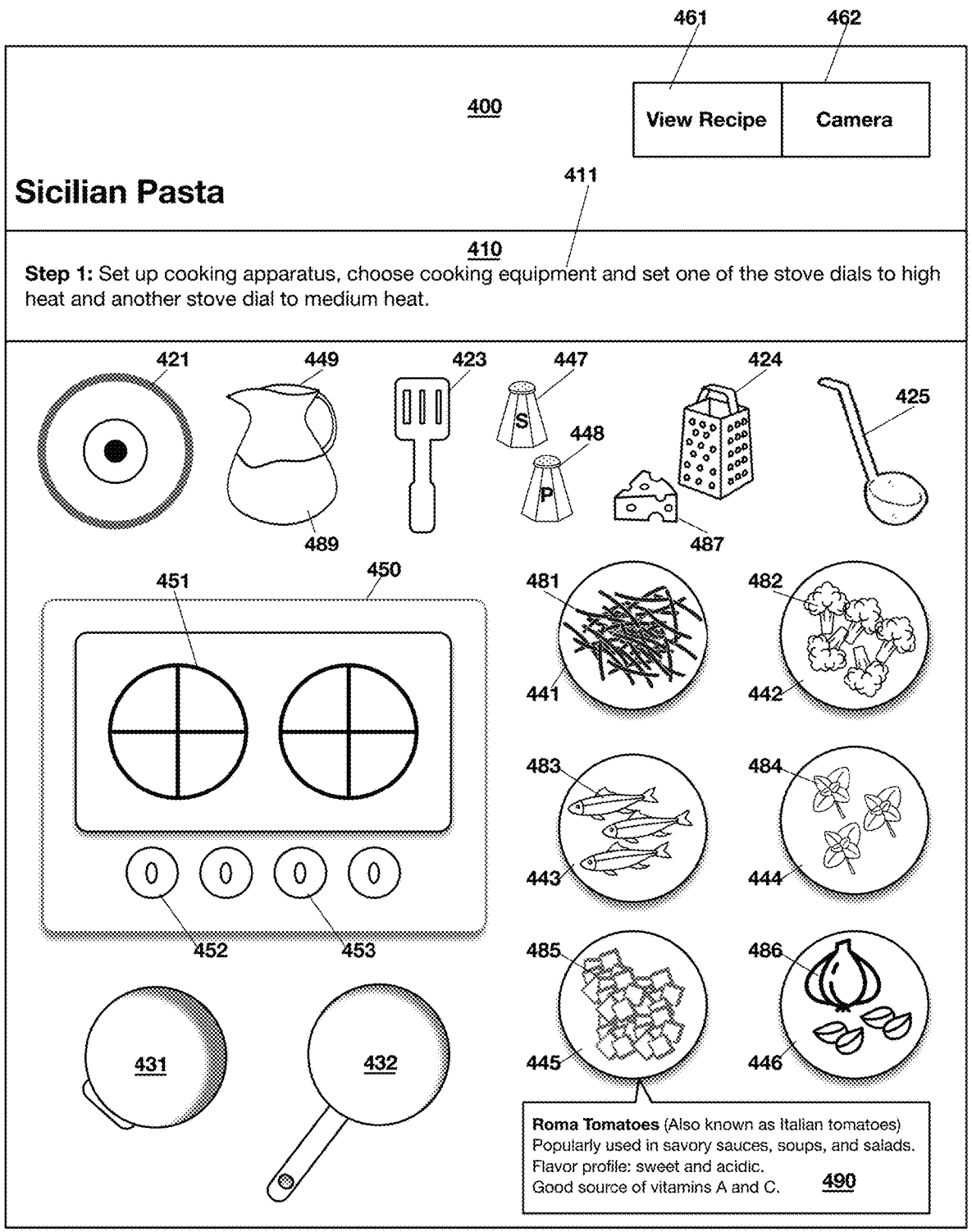
FIGS. 4-11 show exemplary interactive cooking interface screens, wherein each screen comprises a notification panel displaying a current step of a selected recipe and feedback relating to the current step and/or a previous step of the recipe.

Referring to FIG. 4, an exemplary interactive cooking interface screen 400 of a cooking application embodiment is illustrated. As shown, this screen comprises a digital representation of a kitchen or other cooking environment that comprises any number of items that may be employed to perform various steps of the selected recipe, including but not limited to: ingredients (e.g., pasta 481, cauliflower 482, anchovies 483, basil 484, tomatoes 485, garlic 486, cheese 487 and water 489); cookware items (e.g., a lid 421, a pot 431 and a pan 432); kitchen appliances (e.g., a stove 450); and/or kitchen utensils (e.g., a spatula 423, a cheese grater 424, a ladle 425, plates 441-446, and a pitcher 449. It will be appreciated that any of the displayed items may be positioned at any location in the cooking environment. For example, if the environment comprises a digital representation of a kitchen, the items may be located in/on a shelf, tabletop, cabinet, refrigerator or freezer. It will also be appreciated that the location of a given item may be relative to the location of another item (e.g., "next to the eggs," or "in the bowl that's on the counter").

In one embodiment, the cooking environment may only include items that the user requires to successfully complete a selected recipe. In other embodiments, the cooking environment may comprise any number of non-required items to increase difficulty.

The cooking interface may provide additional information to the user regarding each item, for example, in the form of a tooltip 490, modal or information panel. The tooltip 490 may appear when the user hovers over, taps, clicks, double-clicks, or otherwise selects an item, and the tooltip may provide relevant information relating to the selected item (e.g., ingredient information, cookware information, kitchen appliance information and/or kitchen utensil information). The tooltip 490 may additionally or alternatively provide magnification of the selected item such that additional details can be discerned.

As shown in FIG. 4, the interactive cooking interface further comprises a notification panel 410 that is generally adapted to display recipe information associated with a selected recipe. In one embodiment, the notification panel may display instructions 411 or other information relating to a current step of the selected recipe. Displayed instructions 411 may comprise one or more cooking actions to be executed by the user, where such actions may relate to one or more food ingredients, kitchen utensils, cookware items, and/or kitchen appliances. The instructions 411 may refer to absolute position(s) and/or relative position(s) of one or more items.

In the illustrated embodiment, the notification panel 410 displays textual instructions 411 relating to a first step of a selected "Sicilian Pasta" recipe (FIG. 3 at 313). Specifically, the notification panel 410 displays the following instructions 411: "Setup cooking apparatus, choose cooking equipment and set one of the stove dials to high heat and another stove dial to medium heat."

Although not shown, the notification panel may display educational information about the current recipe step (e.g., why the step is performed and/or information about the importance of a particular item or action). For example the notification panel may explain that "a skillet is well-suited for sautéing vegetables," or "anchovies are dissolved into the cooked tomatoes in order to provide salty and umami notes for the dish." In certain embodiments, such educational information may be displayed upon user selection of the notification panel or an icon associated therewith.

The current recipe step may remain on the screen as the user is executing the corresponding action, or it may be hidden. Optionally, the user may hide the instruction 411. Additionally or alternatively, the user may have the option of selecting a link 461 to view the entire recipe, or to go back to a screen displaying a previous step.

As the user executes the action(s) required by the current recipe step, the cooking interface 400 may provide hints or visual/audio/textual indications in order to guide the user in correctly executing the step. For example, in one embodiment, the cooking interface may display one or more ingredients, cookware items, kitchen appliances, and/or kitchen utensils relevant to the current recipe step more prominently than the non-relevant items on the cooking interface. In such embodiment, the cooking interface may flash the relevant item(s). It will be appreciated that in other embodiments, the cooking interface may highlight, enlarge, move, and/or otherwise draw attention to the relevant item(s).

In any event, the user may manipulate the displayed items to follow the current step instructions 411 provided by the notification panel 410. For example, in the illustrated embodiment, the user drag and drop the pot 431 and the pan onto burners 451 of a stove 450. The user may also tap and/or rotate the stove dials 452, 453 to set the temperatures of the burners 451. In other embodiments, the user may select and move items by highlighting, single-clicking, double-clicking, tapping, etc.

In one embodiment (not shown), the user may be required to perform an action more than once in a single step, depending upon the portion size of the ingredient indicated in the instructions 411. For example, if an instruction requires the user to measure one teaspoon of salt to pour in a pot, and one teaspoon is the equivalent of three shakes, then a user may need to drag a salt shaker to a pot, and "shake" it three times (e.g., by shaking their device or by moving the salt back and forth) to complete the instruction successfully.

In certain embodiments, the cooking interface may display one or more of the items in motion and in use, based on the user's actions. For example, the cooking interface may show: a ladle 425 dipped in water and lifted, a spatula 423 moving around in a pan 432 to mix ingredients, a salt dispenser 447 or pepper dispenser 448 flipping upside down with salt/pepper falling into a pan, tomatoes 485 being emptied from a plate 445, water 489 being emptied from a water pitcher 449, a grater 424 grating a chunk of cheese 487 with cheese shavings falling into a pan 432, etc. In such embodiments, the items in use may further be accompanied by sounds and/or haptic feedback. For example, in certain embodiments, the action of straining oil into a jar, the shaking of the salt dispenser, and the squeezing of a lemon may be accompanied by their corresponding sounds.

In one embodiment, once an item has been selected and moved from its original position, usage of the item may be depicted by one or more of the following: showing a vacant space in its original position (indicating unavailability of the item for further use), and/or showing lower levels of contents in a container (e.g., a lower level of olive oil in the transparent bottle).

In certain embodiments, ingredients, cookware items, kitchen appliances and/or kitchen utensils used in a step may be returned to their original positions automatically for use in the next recipe step. Alternatively, the application may require the user to manually return items to their original position.

During the current recipe step, the cooking interface 400 may display visual and/or auditory feedback to the user. Such feedback may be positive or negative and may include: text (e.g., "Wow! That smells great!" or "I don't know, that smells a bit strange . . . "), sounds, emojis or animations appearing on the screen with positive or negative facial expressions, visual indications of the cooking process (e.g. smoke/steam from pot, coils on stove turning red from heat, a raw chicken breast turning brown from heat, a dry looking dish, etc.) and others.

In certain embodiments, the cooking interface 400 may also display other forms of visual and/or auditory feedback to the user regarding timing involved in a particular step. For example, a timer may appear on the screen during a step (see FIG. 6 at 690). Such timer may be automatically set, and may emit a sound or a light upon completion of cooking. In other embodiments, the user may need to manually set the timer on the screen. In yet other embodiments, such as for an increased difficulty setting, the user may receive no indication upon completion of cooking. The cooking interface may also show positive or negative feedback during a single step and/or once the current step is completed (discussed below in reference to FIG. 5).

The cooking interface 400 may include one or more links 462 to allow a user to take a photo of the current step. Additionally or alternatively, the interface may allow the user to record notes relating to a selected recipe and/or a specific step in the recipe. Such notes may be stored locally and/or may be synced to one or more remote note-taking applications.

In one embodiment, the cooking interface 400 may comprise one or more links 461 to allow the user to view, save and/or print information relating to a selected recipe. Upon selecting such link(s), the user may be presented with a screen, modal or window showing: (1) each step required to prepare the selected recipe and/or (2) an itemized list of all ingredients required to prepare the selected recipe. In one embodiment, the user may only be able to view and/or print the itemized list of all ingredients required to prepare the selected recipe after successfully completing the dish. The user may then select one or more of the displayed items in order to print, save, and/or download a list of such items (e.g., for use as a shopping list). In one particular embodiment, the user may select one or more of the displayed items to automatically add them to a shopping list feature of the cooking application and/or to sync such items to another local or cloud-based shopping list application. Additionally or alternatively, the cooking application may allow the user to easily purchase such items, either via a shopping feature of the cooking application or via a connection to a third-party ecommerce application.

Although not shown, exemplary cooking interface screens may comprise any number of links to additional features and screens, such as a link to save progress, a link to return to a previous screen or move forward to the next screen, and/or a link to restart/pause/continue the application.

Figure 5:
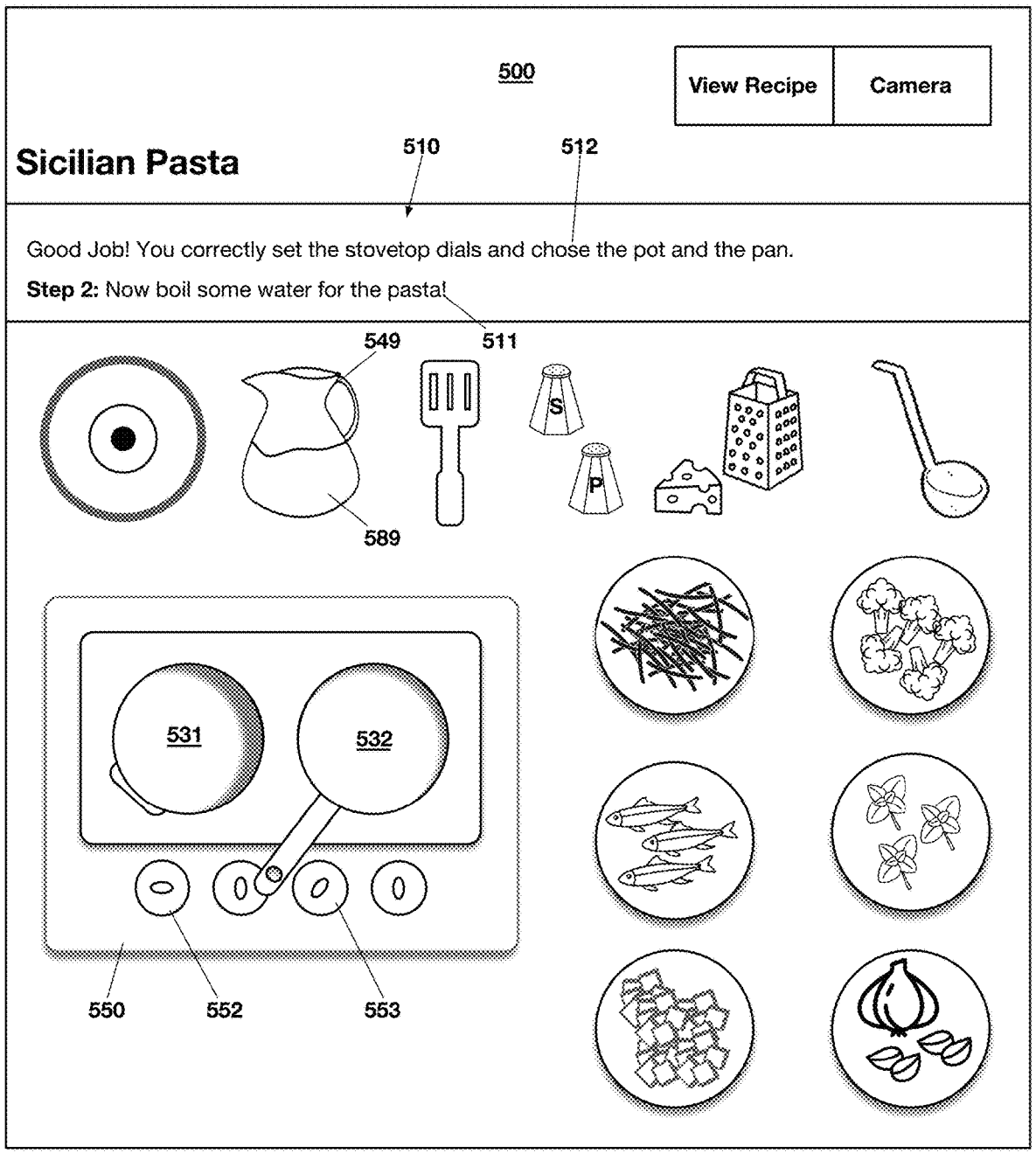

Referring to FIG. 5, an exemplary interactive cooking interface screen 500 of a cooking application embodiment is illustrated. As shown, the notification panel 510 displays the current step of the given recipe 511 and optional feedback information 512.

In the illustrated embodiment, the user has correctly performed the previous instructions (FIG. 4 at 411) and has continued on to the next step of the selected recipe (i.e., the system has updated the current step to the next step in the recipe). As shown, the notification panel 510 now displays instructions 511 corresponding to the updated current step (i.e., "Step 2: Now boil some water for the pasta."). Moreover, the cooking interface screen 500 has been updated to reflect the completed previous step (i.e., the pan 532 and pot 531 are located on the stove 550, and the dials 552, 553 are rotated).

In one embodiment, the notification panel displays feedback information 512 relating to a previous step of the recipe. For example, if the previous step was correctly completed, the notification panel may show positive feedback relating to the previous step (e.g., "Good job! You correctly set the stovetop dials and chose the pot and pan."). As another example, such feedback may comprise a sound (e.g., clapping or spoken words); a happy face emoji; an animation appearing on the screen; and/or checking off or striking through the previous recipe step from the recipe steps list. And, as yet another example, no explicit feedback relating to the previous step may be displayed.

The feedback information 512 may alternatively relate to the current step of the recipe. For example, if the current step is not correctly completed, the notification panel may show negative feedback relating to the current step (e.g., "You did not set the stovetop to medium heat. You must set the stovetop to medium heat before proceeding to step 3."). As another example, such feedback may comprise a sound (e.g., crying or spoken words); a sad emoji; and/or animation appearing on the screen. In one particular embodiment, such feedback information may comprise one or more visual indications relating to the cooking process (e.g., displaying a "burned" ingredient in a dark color).

In certain embodiments, negative feedback information displayed via the notification panel 510 may comprise one or more hints relating to incorrect user actions (e.g., "Looks a bit dry. Are you sure you added the right amount of water?" or "Check that the right ingredient(s) was/were used."). In such cases, the user may not be allowed to continue to the next step until they complete the current step correctly. A user may be allowed a certain number of attempts to retry the incorrectly performed step, or alternatively, the user may be allowed an unlimited number of attempts to do so. In one embodiment, the cooking application may demonstrate how to perform a given step after a certain number of incorrect attempts and may then allow the user to continue on to the next step.

In the illustrated embodiment, the user may interact with the displayed items to follow the directions and complete the current recipe step 511. For example, the user may select the pitcher 549 and drag it to the pot 531 to pour water 589 from the pitcher into the pot. The user may then wait a predetermined amount of time for the water to boil. The start of boiling may be indicated by visual indications of the cooking process (i.e., the water in the pan forming bubbles and steam, the sound of boiling water, a light or beep from the stove, a notification displayed in the notification panel, etc.).

Figure 6:
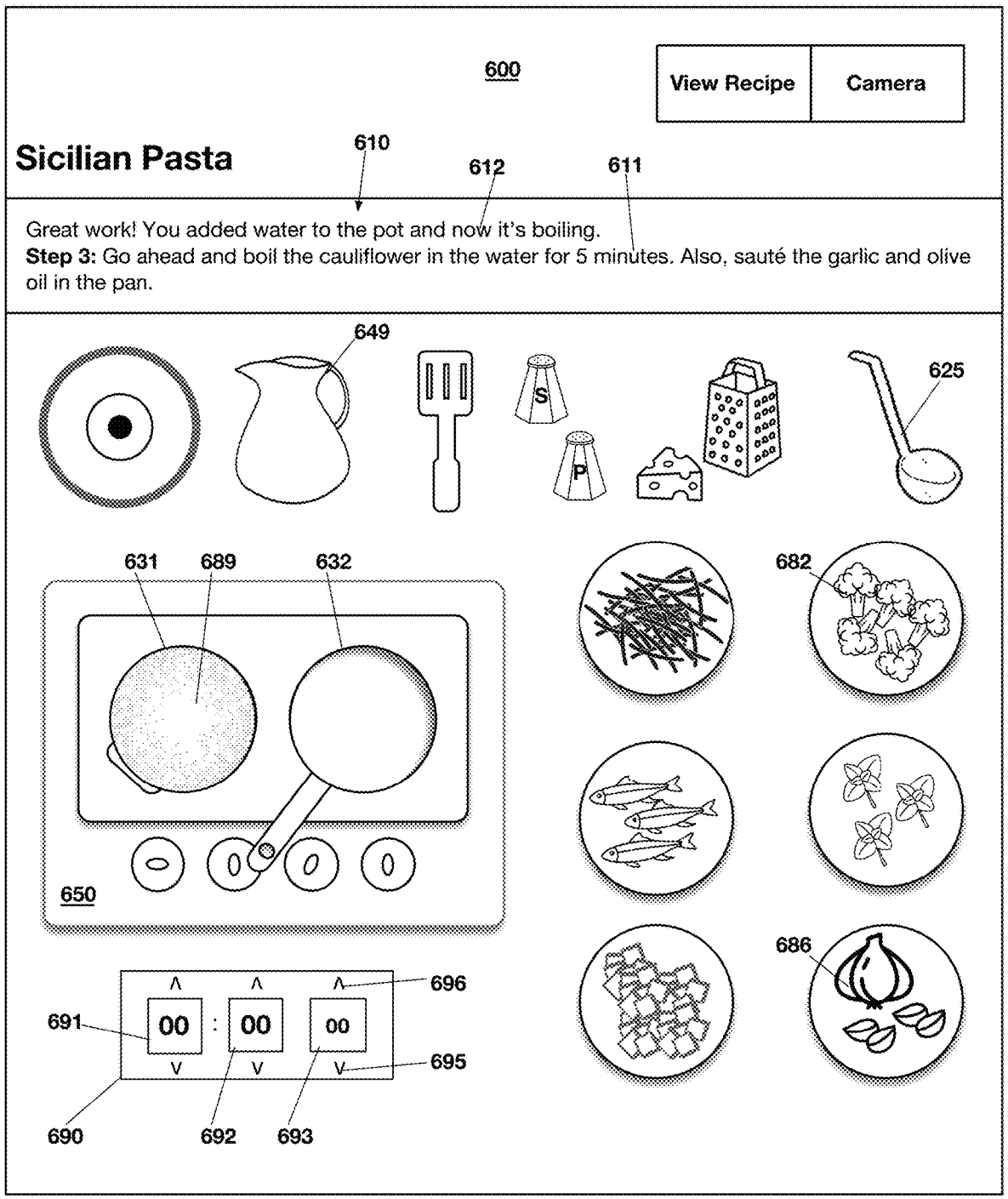

Referring to FIG. 6, an exemplary interactive cooking interface screen 600 of a cooking application embodiment is illustrated. As shown, the screen comprises a notification panel 610 displaying positive feedback (i.e., "Great work! You added water to the pot and now it's boiling.") 612 because the user has correctly completed the previous step (FIG. 5 at 511). The notification panel 610 also displays instructions 611 relating to the updated current recipe step (i.e., "Step 3: Go ahead and boil the cauliflower in the water for 5 minutes. Also, sauté the garlic and olive oil in a pan.").

In the illustrated embodiment, the cooking interface screen 600 has been updated to reflect the completed previous step. For example, the pot 631 is shown on the stove 650 and boiling water 689 is displayed within the pot. Moreover, the pitcher 649 is now shown in an empty state because the water was previously emptied into the pot.

To follow the directions 611 for the current recipe step, a user may drag and drop cauliflower 682 from its position on the tabletop to the pot 631 of boiling water 689 on the stove 650. The user may then drag and drop garlic 686 and olive oil into the pan 632.

In certain embodiments, the cooking interface 600 may display a timer 690. As shown, the user may manually set the hours 691, minutes 692, and/or seconds 693 of the timer 690 by, for example, manipulating buttons 695, 696 or using a keyboard to input a desired time. In order to follow the directions 611 in the illustrated embodiment, the user may set the timer 690 to five minutes.

In certain embodiment, the user may set aside any prepared mixture or ingredient during the cooking process, such as: cooked vegetables, sauces, cooked proteins, baked pastries, etc. Generally, the user may set aside cooked ingredients after a predetermined amount of time has passed and/or feedback is provided regarding the completion of cooking.

In one embodiment, ingredients may be set aside by utilizing one or more available kitchen utensils to drag and drop the cooked ingredients back to their initial position. For example, the user may pick up a ladle 625, then use the ladle to scoop the cauliflower 682 from the pot 631 and drop it onto the original cauliflower plate. In other embodiments, the user may move cooked ingredients to a new location, such as an ice bath or strainer (not shown), which may be positioned anywhere within the cooking interface. And, in yet other embodiments, the user may input a time and then simply leave the ingredients in a cookware item to move on to the next step.

Figure 7:
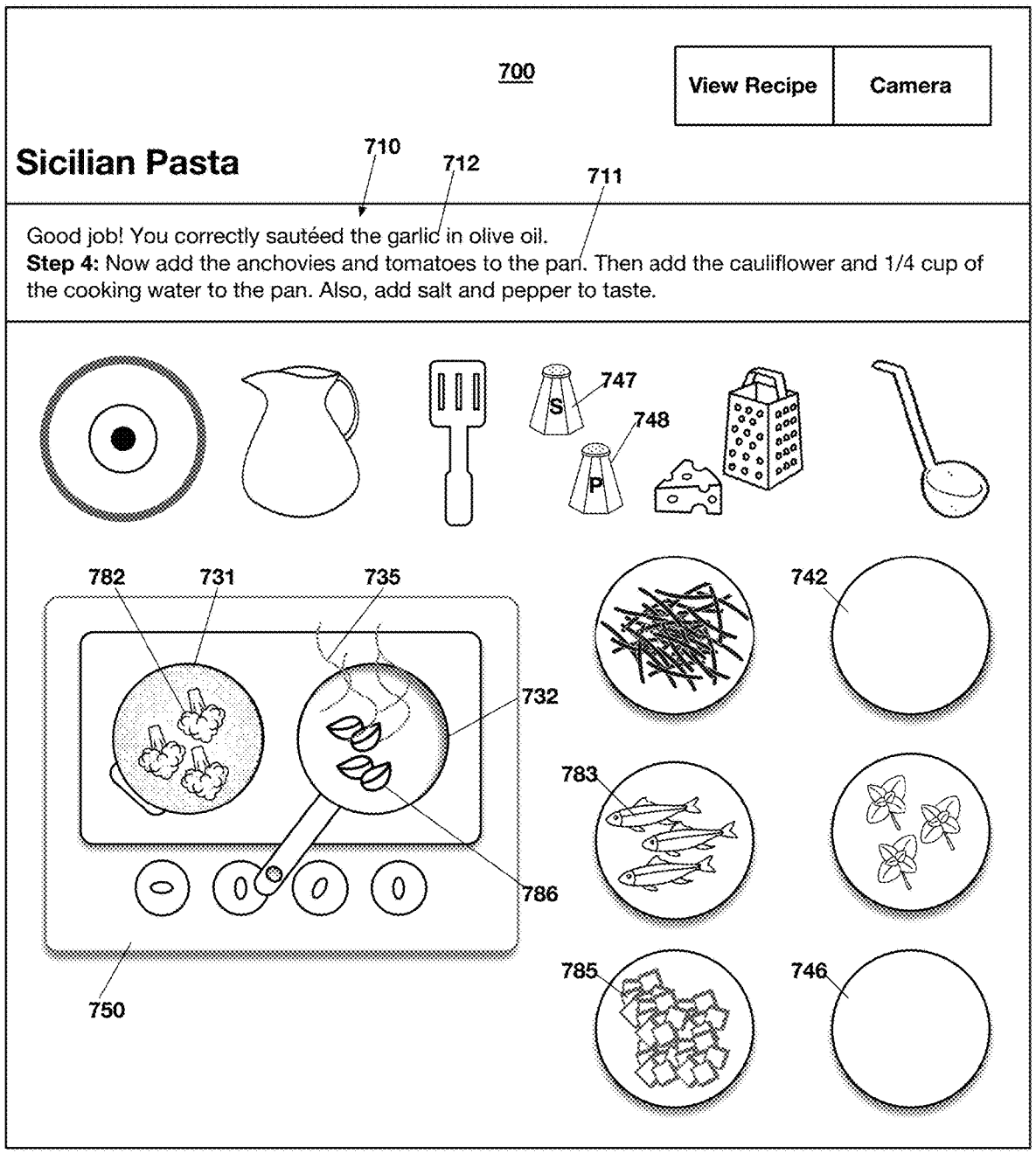

Referring to FIG. 7, an exemplary interactive cooking interface screen 700 of a cooking application embodiment is illustrated. As shown, the notification panel 710 of the interface screen displays positive feedback 712 because the user has correctly completed the previous step (FIG. 6 at 611). The notification panel 710 also displays instructions relating to the updated current recipe step 711.

In the illustrated embodiment, the cooking interface screen 700 has been updated to reflect the completed previous step. As shown, garlic 786 and olive oil are displayed in the pan 732 on the stove 750, with steam and smoke 735 emanating therefrom; cauliflower 782 is displayed in the pot 731; and both the cauliflower plate 742 and the garlic plate 746 are displayed in an empty state.

To follow the displayed instructions, the user may drag and drop anchovies 783 and tomatoes 785 into the pan 732.

After a predetermined amount of time, the cooking interface screen 700 may display visual feedback to the user that the anchovies and tomatoes are cooked. For example, the anchovies 783 may be shown to dissolve, the tomatoes 785 may be shown to sweat and shrinking, and steam and smoke may be shown emanating from the pan 732.

Upon receiving the visual feedback, the user may drag the salt 747 and pepper 748 dispensers to the pan and then move such items back and forth to add the respective ingredients. Such action may result in an animation of salt and pepper crystals falling down onto the cooking mixture of anchovies 783 and tomatoes 785.

Figure 8:
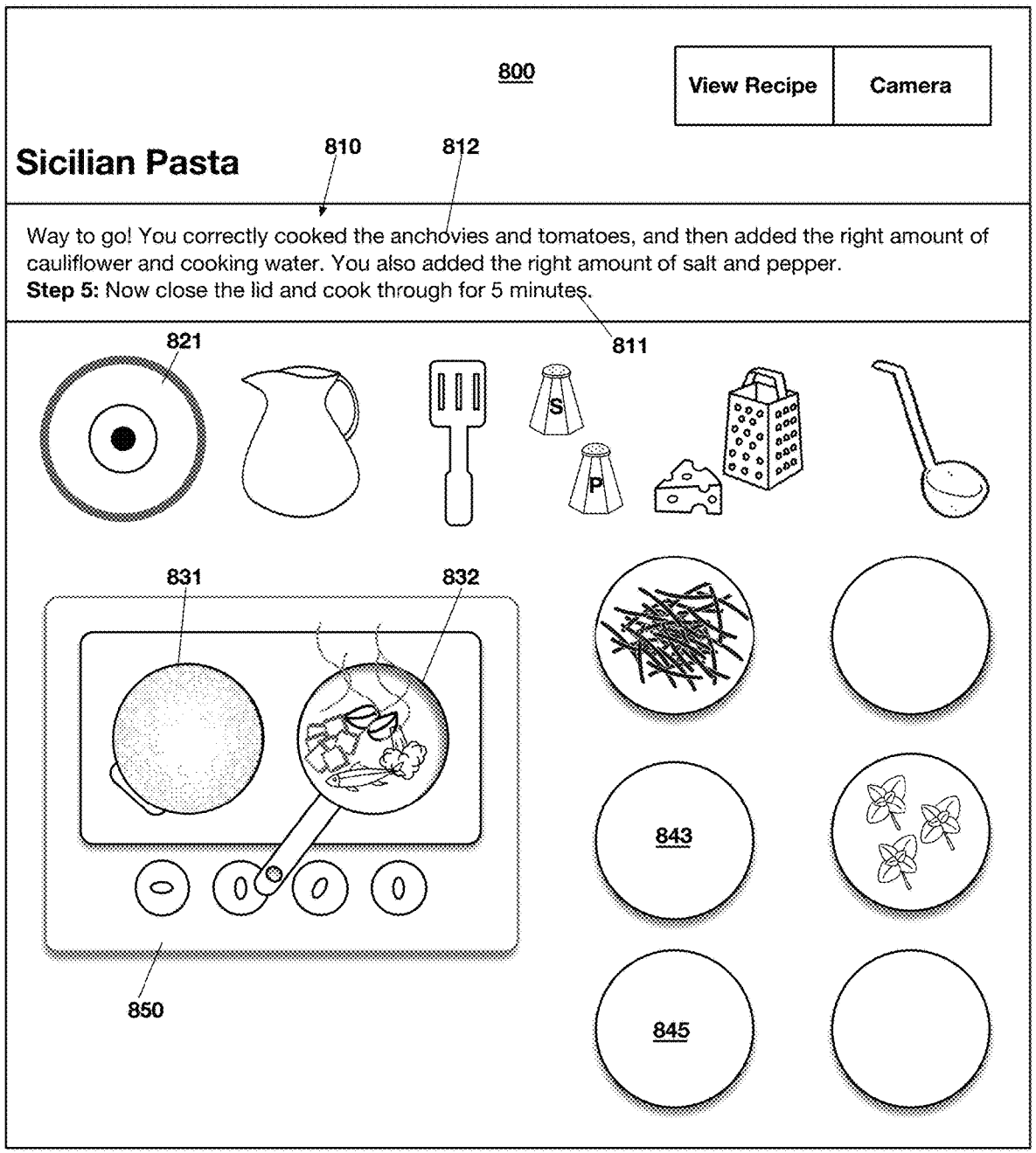

Referring to FIG. 8, an exemplary interactive cooking interface screen 800 of a cooking application embodiment is illustrated. As shown, the screen comprises a notification panel 810 that displays feedback 812 relating to a correctly completed previous recipe step (FIG. 7 at 711) and instructions relating to an updated current recipe step 811.

In the illustrated embodiment, the cooking interface screen 800 has been updated to reflect the completed previous step. For example, the anchovies plate 843 and the tomatoes plate 845 are both shown to be empty. Moreover, the mixture of anchovies, tomatoes, garlic and cauliflower may be shown to be cooked/cooking in the pan 832 via the inclusion of animated steam and/or a change in color.

To complete the displayed instructions, the user may drag and drop the lid 821 from its initial position onto the pan 832. Upon such action, the application may show the lid 821 positioned on top of the pan 832. The application may also display an animation representing dissipation of any steam that was emanating from the pan before the lid was applied.

Figure 9:
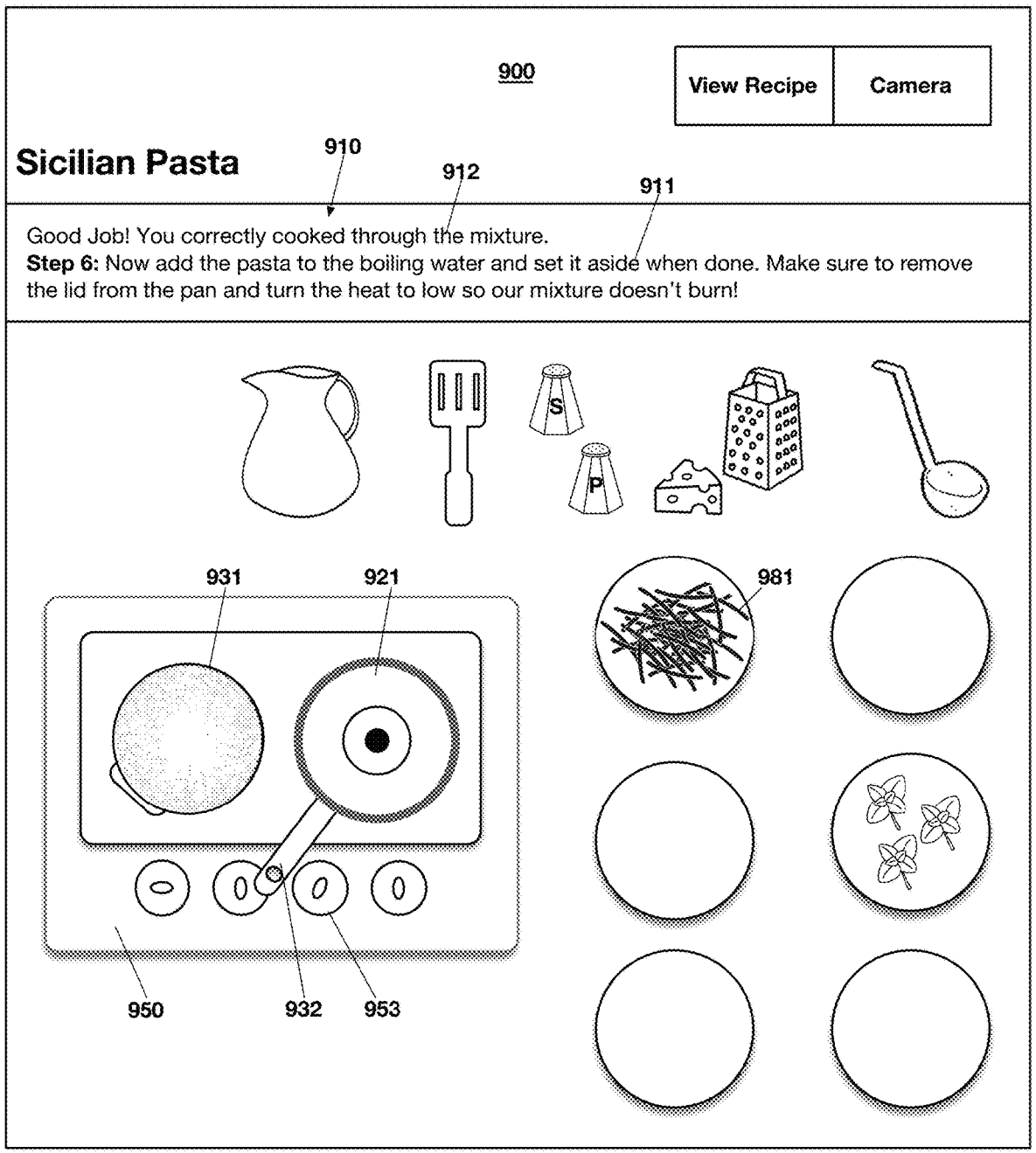

Referring to FIG. 9, an exemplary interactive cooking interface screen 900 of a cooking application embodiment is illustrated. As shown, the screen comprises a notification panel 910 that displays feedback 912 relating to a correctly completed previous recipe step (FIG. 8 at 811) and instructions relating to a current recipe step 911.

In the illustrated embodiment, the cooking interface screen 900 has been updated to reflect the completed previous step. Specifically, the lid 921 is shown on the pan 932 and the original lid location is now shown to be empty.

To complete the displayed instructions, the user may drag and drop the dry pasta 981 into the pot of boiling water 931 located on the stove 950. The user may then wait a certain amount of time for the pasta to cook in the boiling water. Once the user has determined that the pasta 981 has finished cooking, the user may set it aside (e.g., by dragging and dropping back to an initial location). Additionally, the user may drag the lid 921 from the pan 932 back to its initial position, and then tap/rotate the stove dial 953 to set the burner associated with the pan 932 to low heat.

Exemplary visual feedback displayed for the cooking actions associated with this recipe step may include the: the pasta falling into the pot, water splashing out of the pot, the pasta becoming softer and coiled, and/or the pasta changing in color. Additional visual or auditory indications may be transmitted when the pasta has finished cooking, when the lid is removed from the pan, and/or when the user correctly sets the stove to low heat.

Figure 10:
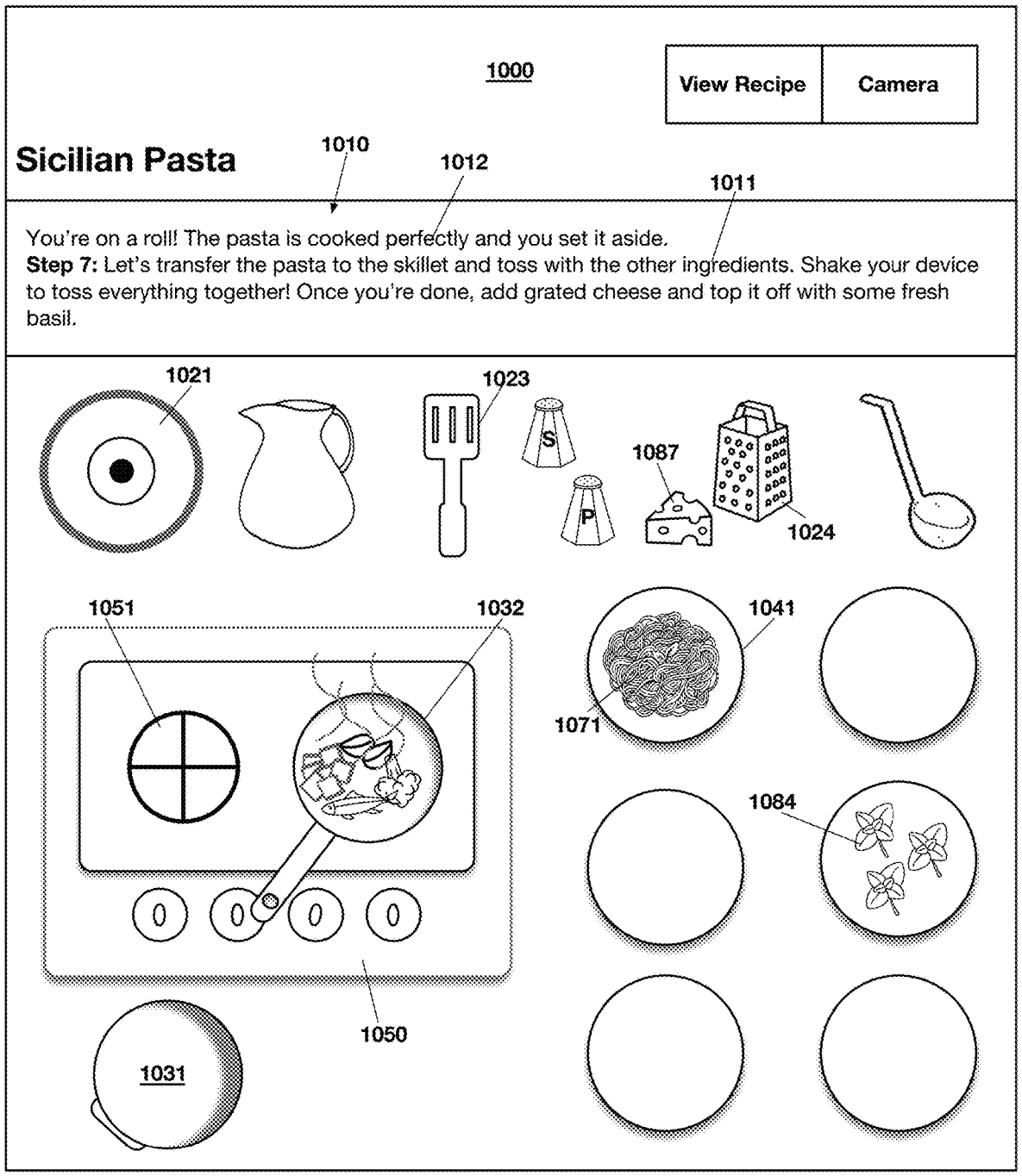

Referring to FIG. 10, an exemplary interactive cooking interface screen 1000 of a cooking application embodiment is illustrated. As shown, the screen comprises a notification panel 1010 that displays feedback 1012 relating to a correctly completed previous recipe step (FIG. 9 at 911) and instructions relating to a current recipe step 1011.

In the illustrated embodiment, the cooking interface screen 1000 has been updated to reflect the completed previous step. As shown, the cooked pasta 1071 is displayed on the pasta plate 1041; the lid 1021 is shown to be removed from the pan 1032; the pot 1031 is shown to be empty and removed from the stove 1050 burner 1051; and the lidless pan 1032 is shown to include the cooked mixture.

Accordingly, to complete the instructions of the current step 1011, the user may first drag and drop the cooked pasta 1071 into pan 1032. The user may then select a kitchen utensil, such as a spatula 1023 or tongs, and move the utensil back and forth within the pan 1032 to mix the ingredients. Alternatively, the user may simply drag the utensil to the pan 1032 and the screen may automatically depict the utensil moving around the pan to mix the ingredients.

The user may then top the dish with cheese 1087 and basil 1084. In this step, the user may select the grater 1024 and block of cheese 1087, and move them both to the pan 1032. Such action may automatically result in a visual depiction of the grater 1024 grating the cheese 1087 over the pan 1032, with grated cheese falling downward onto the mixture. Alternatively, the user may repeatedly drag the grater 1024 along the block of cheese 1087 to manually grate cheese onto the mixture. The user may then drag and drop the basil 1084 into the pan 1032.

Figure 11:
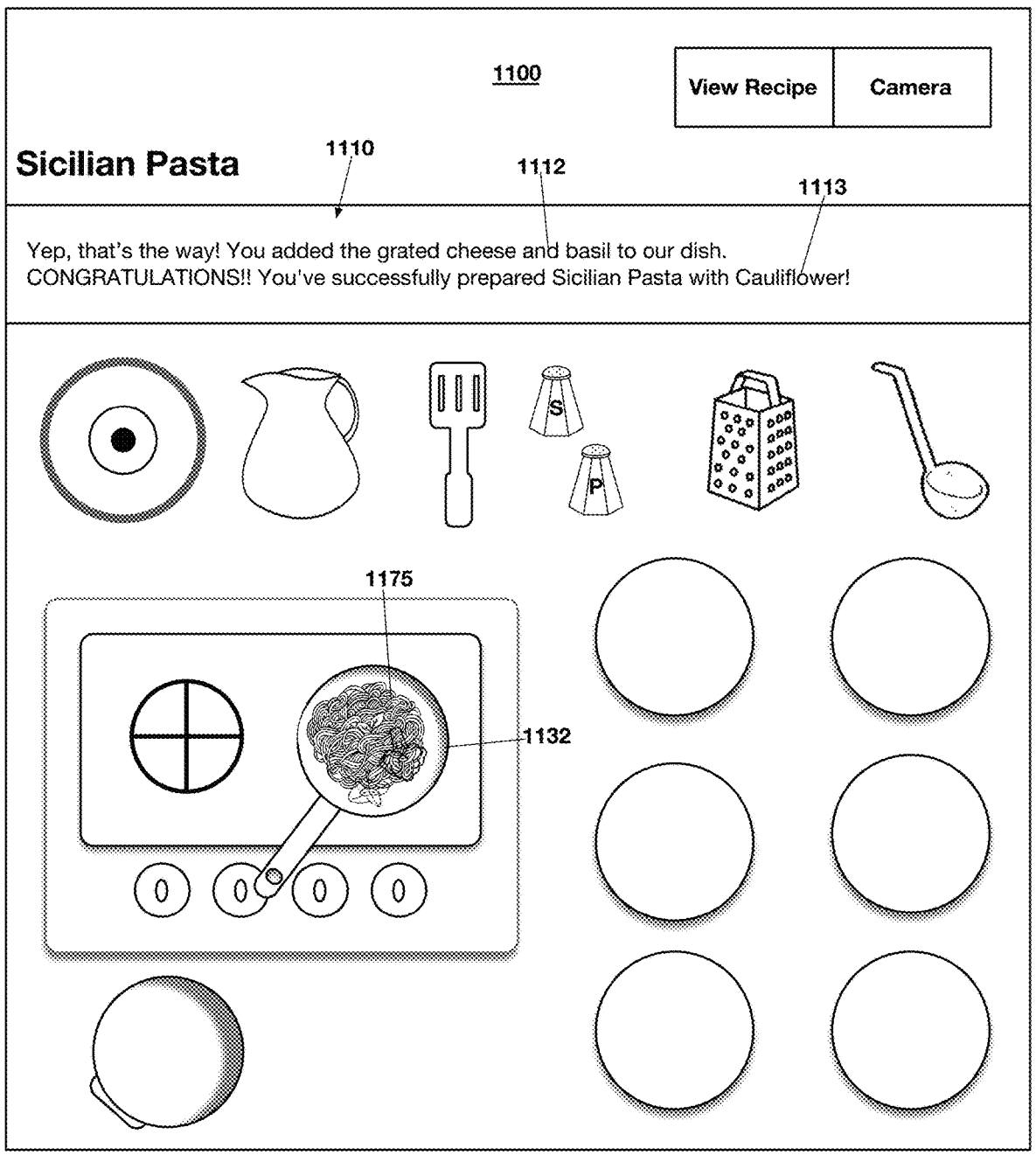

Referring to FIG. 11, an exemplary interactive cooking interface screen 1100 of a cooking application embodiment is illustrated. As shown, the screen comprises a notification panel 1110 that displays feedback 1112 relating to a correctly completed previous recipe step (FIG. 10 at 1011). In this embodiment, the notification panel does not display a current recipe step, as all of the recipe steps have been successfully completed by the user. Rather, the notification panel displays a message 1113 indicating successful completion of the recipe.

In the illustrated embodiment, the cooking interface screen 1100 has been updated to reflect the completed previous step. Specifically, the completed dish 1175 is displayed in the pan 1132.

Figure 12:
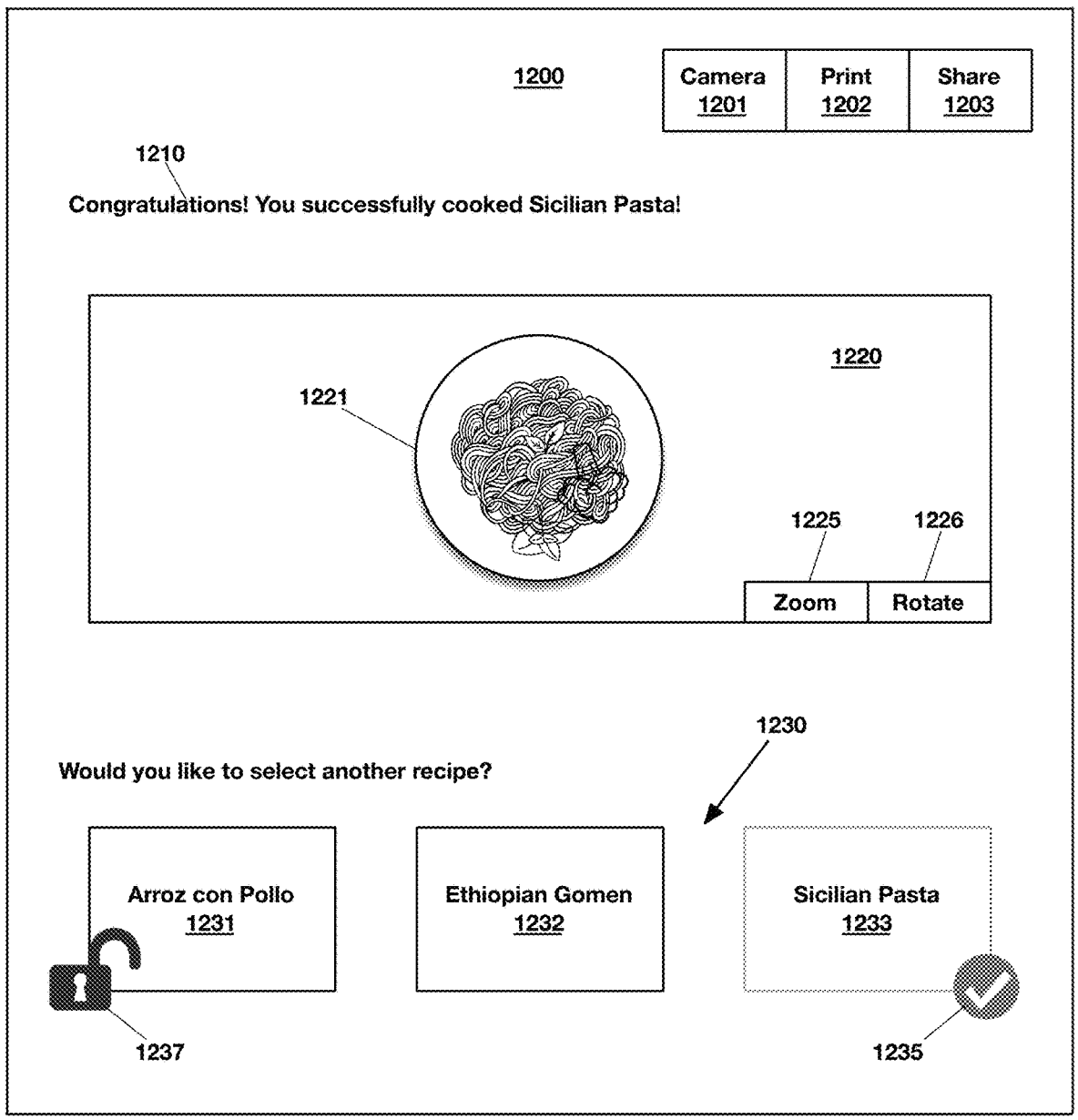
FIG. 12 shows an exemplary recipe completion screen 1200 according to an embodiment.

Referring to FIG. 12, an exemplary recipe completion screen 1200 of a cooking application embodiment is illustrated. In one embodiment, this screen may be displayed to the user upon successful completion of all steps associated with a selected recipe.

As shown, the recipe completion screen 1200 may display a notification 1210 indicating successful completion of a recipe. In one embodiment, the completed recipe screen 1200 may further comprise a dish display area 1220 wherein a visual depiction of the resulting dish 1221 is displayed to the user. The dish display area 1220 may include a number of links or buttons to allow the user to zoom in or out 1225 and/or to rotate 1226 the displayed dish.

The recipe completion screen 1200 may further comprise a recipes list 1230 showing any number of recipes 1231-1233 available for selection. As shown, a visual indication 1235 such as a checkmark icon may be displayed alongside a recipe 1233 in the recipes list 1230 to indicate that the corresponding recipe has been completed by the user. In certain embodiments, the user may be able to select a completed recipe to view some or all of the recipe steps.

In one embodiment, an award may be provided to the user upon completion of a recipe. For example, the user may be awarded in-app currency, points, discounts, ingredients, cookware, kitchen appliances and/or kitchen utensils, etc. In one particular embodiment, completion of a given recipe may result in the unlocking of a previously locked recipe 1231 such that the unlocked recipe may be selected by the user. In such case, the newly unlocked recipe may be displayed along with a visual indication 1237, such as an unlock icon.

Generally, the recipe completion screen may comprise any number of links to allow a user to take a photo of the completed dish 1201, print the corresponding recipe instructions 1202 and/or share recipe content 1203 via social media platforms, messaging applications, etc. In certain embodiments, user achievements, recipes, captured images, notes and other content may be shared to an online storage account where such information may be maintained privately or shared with others.

Figure 13:
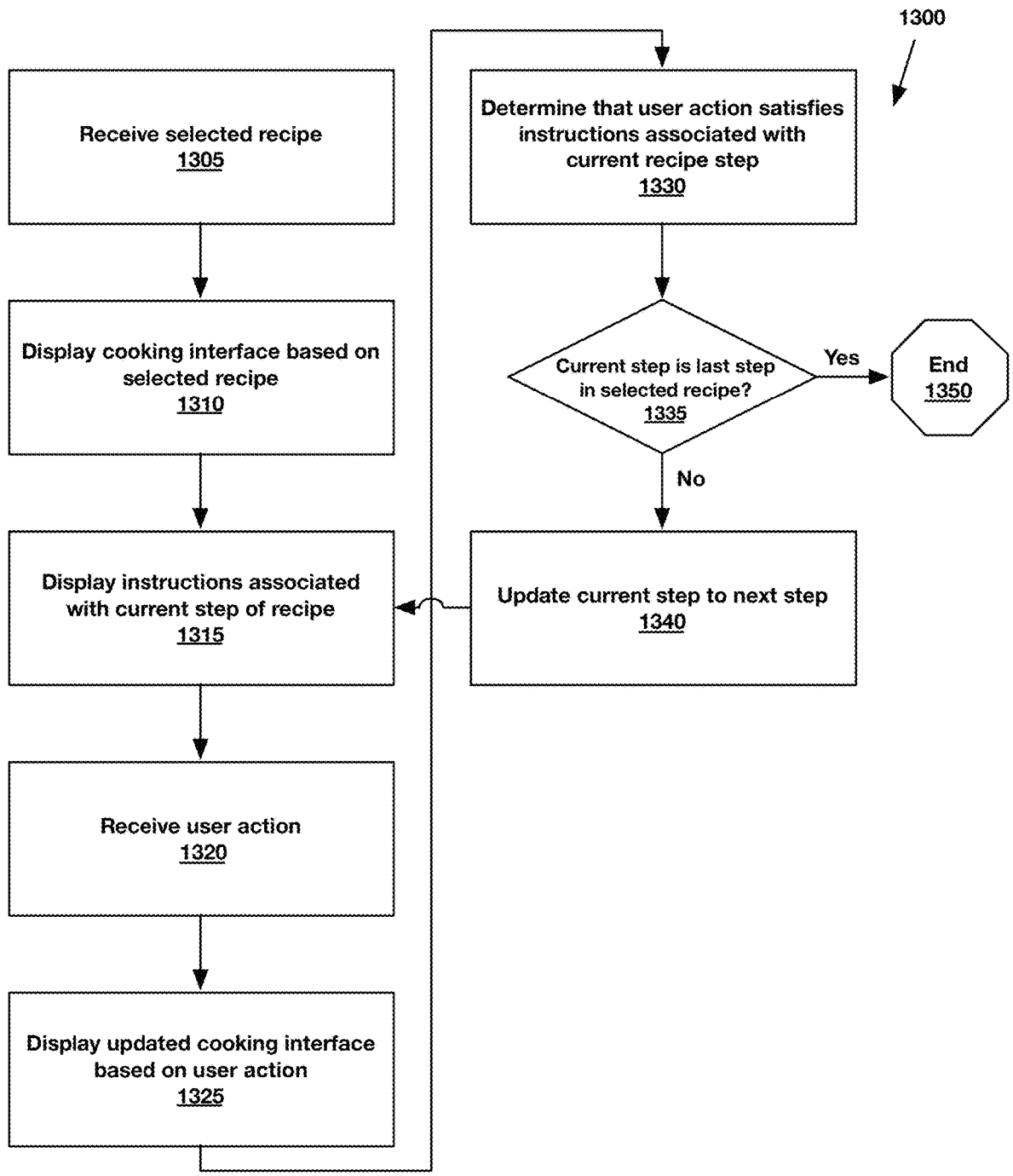
FIG. 13 shows an exemplary interactive cooking method 1300 according to an embodiment.

Referring to FIG. 13, an exemplary method 1300 according to an embodiment is illustrated. As shown, the method may begin when a user selects a recipe from a list of available recipes and such selected recipe is received by the system 1305.

At step 1310, the system displays an interactive cooking interface based on the selected recipe. As discussed above, the interface may comprise any number of ingredients, cookware items, kitchen appliances and/or kitchen utensils that may be selected and/or manipulated by the user to digitally "cook" the selected recipe.

At step 1315, the system displays instructions relating to the current step of the selected recipe. A selected recipe may be associated with a plurality of steps, where each step comprises instructions. The instructions relate to one or more cooking actions, each of which is associated with one or more of the displayed ingredients, cookware items, kitchen appliances, and kitchen utensils.

At step 1320, the user attempts to follow the displayed instructions by performing a user action and such input is received by the system. At step 1325, the system may display an updated cooking interface based on the user action. The updated interface may comprise an updated status of each of the items. For example, the system may display visual feedback, such as an ingredient moving from one location to another, an amount of an ingredient changing, a color of an item changing, steam, boiling, burning, glowing, browning, etc.

Upon completion of the user action, the system determines that the user action satisfies the instructions associated with the current recipe step 1330. In certain embodiments, the updated interface may display a notification indicating that the current recipe step has been successfully completed by the user, when the user action satisfies the instructions associated with the step.

At step 1335, the system determines whether the current step is the last step in the recipe. If so, the method may end 1350. In certain embodiments, a dish completion screen comprising an image or video of the completed dish may be displayed to the user upon completion of the recipe. Optionally, the user may also be presented with a reward for completing the recipe, such as but not limited to awarding the user in-app currency, unlocking a recipe and/or awarding the user one or more badges or stickers.

However, if the current step is not the final step in the selected recipe, the method may continue by updating the current step to the next step in the recipe 1340 and returning to step 1315. In such cases, updated instructions associated with the next step (i.e., the updated current step) may be displayed to the user such that they may continue the interactive cooking experience.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A computer-implemented method comprising:
   A. storing, by a computer, in a memory:
   a plurality of available ingredients;
   one or more available kitchen appliances;
   one or more available cookware items; and
   one or more available kitchen utensils;
   B. storing, by the computer, in the memory, a plurality of available recipes, each available recipe associated with recipe information comprising a plurality of sequential recipe steps, wherein each of the recipe steps relating to a given available recipe is associated with:
one or more required cooking items selected from the group consisting of:
a required ingredient selected from the plurality of available ingredients;
a required kitchen appliance selected from the one or more available kitchen appliances;
a required cookware item selected from the one or more available cookware items; and
a required kitchen utensil selected from the one or more available kitchen utensils;
a required action relating to the one or more required cooking items; and an instruction relating to the required action;

C. displaying, by the computer, to a user, the plurality of available recipes;

D. a receiving, by the computer, from the user, a selected recipe from the plurality of available recipes;

E. displaying, by the computer, to the user, a cooking interface comprising the one or more required cooking items associated with a current recipe step,
wherein each of the one or more required cooking items is associated with a current state, and
wherein each of the one or more required cooking items is displayed via the cooking interface according to the respective current state;

F. providing, by the computer, to the user, the instruction associated with the current recipe step;

G. a receiving, by the computer, via the cooking interface, a user action relating to the one or more required cooking items associated with the current recipe step, wherein the user action comprises one or more of the group consisting of: adding a required cookware item to a required kitchen appliance, removing a required cookware item from a required kitchen appliance, adding a required ingredient to a required kitchen appliance, removing a required ingredient from a required kitchen appliance, adding a required ingredient to a required kitchen utensil, removing a required ingredient from a required kitchen utensil, moving a required kitchen utensil to a required ingredient, adding a required ingredient to a required cookware item, removing a required ingredient from a required cookware item, adding a first required ingredient to one or more additional required ingredients, setting a parameter of a required kitchen appliance, and setting a parameter of a required kitchen utensil;

H. providing, by the computer, to the user, feedback information relating to the user action; and I. upon determining, by the computer, that the user action matches the required action associated with the current recipe step:
updating the current state of the one or more required cooking items associated with the current step, based on the user action; and
upon determining, by the computer, that the current recipe step is not a last recipe step associated with the selected recipe:
updating the current recipe step to a next recipe step associated with the selected recipe; and
repeating steps E through I
wherein the selected recipe is associated with a first recipe step that itself is associated with:
first required cooking items comprising:
a first required kitchen appliance associated with an initial state and a final state, both comprising an active status and a location within the cooking interface;
a first required cookware item associated with:
an initial state comprising an empty status, a location within the cooking interface that is on or in the first required kitchen appliance: and
a final state comprising a full status and the location; and
a first required ingredient associated with:
an initial state comprising an uncooked status and an initial location within the cooking interface: and
a final state comprising a cooked status and a final location within the cooking interface that is on or in the first required cookware item and that is different than the initial location:
a first required action comprising moving the first required ingredient from the initial location to the final location: and
a first instruction relating to the first required action, and
wherein, when the first recipe step is the current recipe step;
the first instruction is displayed via the cooking interface;
until a user action matching the first required action is received, each of the first required cooking items is displayed via the cooking interface according to its initial state; and
upon receiving a user action that matches the first required action, each of the first required cooking items is displayed via the cooking interface according to its final state.

2. A computer-implemented method according to claim 1, wherein the recipe information further comprises one or more of the group consisting of: a name, a description, an image, a video, an animations, and an audio file.

3. A computer-implemented method according to claim 1, wherein each of the available ingredients stored in the memory is associated with ingredient information comprising one or more of the group consisting of: a name, a description, an image, a video, an animation, an audio file, a flavor profile, a texture, a country of origin, a common use, nutritional information, safe-handling information, permitted parameters, a current parameter, a current preparation status, permitted preparation statuses, permitted kitchen appliances, a current kitchen appliance, permitted cookware items, a current cookware item, permitted kitchen utensils and a current kitchen utensil.

4. A computer-implemented method according to claim 3, wherein the ingredient information further comprises one or more permitted cooking states.

5. A computer-implemented method according to claim 4, wherein each of the permitted cooking states relates to a range of target temperatures.

6. A computer-implemented method according to claim 1, wherein each available kitchen appliances stored in the memory is associated with appliance information comprising one or more of the group consisting of: a name, a description, an image, a video, an animation, an audio file, permitted temperature settings, a current temperature setting, permitted usage times, a current usage time, permitted ingredients, current ingredients, permitted cookware items, and current cookware items.

7. A computer-implemented method according to claim 1, wherein each of the available cookware items stored in the memory is associated with cookware information comprising one or more of the group consisting of: a name, a description, an image, a video, an animation, an audio file, one or more materials, a cooking rate, a conductivity, permitted statuses, a current status, permitted ingredients, current ingredients, permitted appliances, a current appliance, permitted utensils, and a current utensil.

8. A computer-implemented method according to claim 1, wherein each of the available kitchen utensils stored in the memory is associated with utensil information comprising one or more of the group consisting of: a name, a description, an image, a video, an animation, an audio files, permitted statuses, a current status, permitted usage times, a current usage time, permitted ingredients, current ingredients, permitted appliances, a current appliance, permitted cookware items, and a current cookware item.

9. A computer-implemented method according to claim 1, wherein the cooking interface further comprises a digital representation of a kitchen.

10. A computer-implemented method according to claim 1, wherein the user action comprises setting a parameter of a required kitchen appliance.

11. A computer-implemented method according to claim 10, wherein the user action further comprises adding a required ingredient to the required kitchen appliance.

12. A computer-implemented method according to claim 11, wherein the parameter of the required kitchen appliance comprises one or more of the group consisting of: a time and a temperature.

13. A computer-implemented method according to claim 1, wherein the feedback information comprises one or more of: text, video, sound and an animation.

14. A computer-implemented method according to claim 1, wherein:
  the one or more required cooking items associated with the current recipe step comprises a required ingredient and a required kitchen appliance;
  the required ingredient is further associated with a plurality of permitted states, each relating to a target temperature;
  the required kitchen appliance is further associated with a plurality of permitted states, each relating to a permitted temperature; and
  the user action comprises:
    setting the required kitchen appliance to a permitted temperature; and
    adding the required ingredient to the required appliance.

15. A system comprising one or more computers and one or more storage devices storing instructions that, when executed by the one or more computers, cause the one or more computers to perform operations comprising;
  A. storing, in the one or more storage devices:
  a plurality of available ingredients; one or more available kitchen appliances; one or more available cookware items; and one or more available kitchen utensils;
  B. storing, in the one or more storage devices, a plurality of available recipes, each available recipe associated with recipe information comprising a plurality of sequential recipe steps,
    wherein each of the recipe steps relating to a given available recipe is associated with:
    one or more required cooking items selected from the group consisting of:
      a required ingredient selected from the plurality of available ingredients;
      a required kitchen appliance selected from the one or more available kitchen appliances;
      a required cookware item selected from the one or more available cookware items; and
      a required kitchen utensil selected from the one or more available Kitchen utensils;
      a required action relating to the one or more required cooking items; and an instruction relating to the required action;
  C. displaying, to a user, the plurality of available recipes;
  D. receiving, from the user, a selected recipe from the plurality of available recipes;
  E. displaying, to the user, a cooking interface comprising the one or more required cooking items associated with a current recipe step,
    wherein each of the one or more required cooking items is associated with a current state, and
    wherein each of the one or more required cooking items is displayed via the cooking interface according to the respective current state;
  F. providing, to the user, the instruction associated with the current recipe step;
  G. a receiving, from the user, via the cooking interface, a user action relating to the one or more required cooking items associated with the current recipe step,
    wherein the user action comprises one or more of the group consisting of:
      adding a required cookware item to a required kitchen appliance, removing a required cookware item from a required kitchen appliance, adding a required ingredient to a required kitchen appliance, removing a required ingredient from a required kitchen appliance, adding a required ingredient to a required kitchen utensil, removing a required ingredient from a required kitchen utensil, moving a required kitchen utensil to a required ingredient, adding a required ingredient to a required cookware item, removing a required ingredient from a required cookware item, adding a first required ingredient to one or more additional required ingredients, setting a parameter of a required kitchen appliance, and setting a parameter of a required kitchen utensil;
  H. providing, to the user, feedback information relating to the user action; and
  I. upon determining, that the user action matches the required action associated with the current recipe step:
    updating the current state of the one or more required cooking items associated with the current step, based on the user action; and
    upon determining, by the computer, that the current recipe step is not a last recipe step associated with the selected recipe:
    updating the current recipe step to a next recipe step associated with the selected recipe; and
    repeating steps E through h wherein the selected recipe is associated with a first recipe step that itself is associated with;
    first required cooking items comprising:
      a first required kitchen appliance associated with an initial state and a final state, both comprising an active status and a location within the cooking interface:
      a first required cookware item associated with:
        an initial state comprising an empty status, a location within the cooking interface that is on or in the first required kitchen appliance: and a final state comprising a full status and the location: and a first required ingredient associated with:

an initial state comprising an uncooked status and an initial location within the cooking interface: and a final state comprising a cooked status and a final location within the cooking interface that is on or in the first required cookware item and that is different than the initial location;

a first required action comprising moving the first required ingredient from the initial location to the final location; and a first instruction relating to the first required action, and wherein, when the first recipe step is the current recipe step:

the first instruction is displayed via the cooking interface;

until a user action matching the first required action is received, each of the first required cooking items is displayed via the cooking interface according to its initial state; and upon receiving a user action that matches the first required action each of the first required cooking items is displayed via the cooking interface according to its final state.

16. A system according to claim 15, wherein the user action comprises setting a parameter of a required kitchen appliance.

17. A system according to claim 16, wherein the user action further comprises adding a required ingredient to the required kitchen appliance.

18. A system according to claim 17, wherein the parameter of the required kitchen appliance comprises one or more of the group consisting of: a time and a temperature.

* * * * *